(12) United States Patent
Damm et al.

(10) Patent No.: US 10,656,598 B2
(45) Date of Patent: May 19, 2020

(54) HOLOGRAPHIC LIGHT FIELD IMAGING DEVICE AND METHOD OF USING THE SAME

(71) Applicant: VISBY CAMERA CORPORATION, San Francisco, CA (US)

(72) Inventors: Ryan Althoff Damm, Fairfax, CA (US); Kris Somboon Chaisanguanthum, Kansas City, MO (US)

(73) Assignee: Visby Camera Corporation, San Francisco, CA (US)

( * ) Notice: Subject to any disclaimer, the term of this patent is extended or adjusted under 35 U.S.C. 154(b) by 629 days.

(21) Appl. No.: 15/288,728

(22) Filed: Oct. 7, 2016

(65) Prior Publication Data

US 2017/0102671 A1    Apr. 13, 2017

Related U.S. Application Data

(60) Provisional application No. 62/239,799, filed on Oct. 9, 2015.

(51) Int. Cl.
*G03H 1/04* (2006.01)
*G02B 27/22* (2018.01)
(Continued)

(52) U.S. Cl.
CPC ....... *G03H 1/0402* (2013.01); *G02B 27/2214* (2013.01); *G03B 35/10* (2013.01); *G03H 1/0866* (2013.01); *G03H 1/34* (2013.01); *H04N 13/229* (2018.05); *G03B 37/00* (2013.01); *G03H 2001/0434* (2013.01); *G03H 2223/14* (2013.01); *G03H 2223/23* (2013.01); *G03H 2226/11* (2013.01)

(58) Field of Classification Search
CPC ...... G03H 1/0402; G03H 1/34; G03H 1/0866; G02B 24/2214
See application file for complete search history.

(56) References Cited

U.S. PATENT DOCUMENTS 7,218,448 B1    5/2007 Cathey, Jr. et al.
7,792,423 B2    9/2010 Raskar et al.
(Continued)

FOREIGN PATENT DOCUMENTS

WO    2011044460    4/2011

OTHER PUBLICATIONS

S. G. Mallet and Z. Zhang; Matching Pursuits with Time-Frequency Dictionaries, IEEE Transactions on Signal Processing, Dec. 1993, pp. 3397-3415.
(Continued)

*Primary Examiner* — Obafemi O Sosanya
(74) *Attorney, Agent, or Firm* — Hamilton, Brook, Smith & Reynolds, P.C.

(57) ABSTRACT

A holographic light field imaging device and method of using the same. The holographic light field imaging device may optically compress the light field into a lower-dimensional, coded representation for algorithmic reconstruction by transforming the light field in a known, calculable way. The resulting wavefront may be optically compressed before capture, wherein the compression may later be reversed via software algorithm, recovering a representation of the original light field.

32 Claims, 14 Drawing Sheets

(51) Int. Cl.
G03B 35/10 (2006.01)
H04N 13/229 (2018.01)
G03H 1/08 (2006.01)
G03H 1/34 (2006.01)
G03B 37/00 (2006.01)

(56) References Cited

U.S. PATENT DOCUMENTS

| | | | |
|---|---|---|---|
| 2004/0021871 A1* | 2/2004 | Psaltis | G01B 9/021 356/451 |
| 2004/0021920 A1 | 2/2004 | Psaltis | |
| 2006/0121358 A1 | 6/2006 | Rich et al. | |
| 2012/0274568 A1 | 11/2012 | Lenchenkov et al. | |
| 2013/0201343 A1 | 8/2013 | Jiang et al. | |
| 2013/0321581 A1 | 12/2013 | El-Ghoroury et al. | |
| 2016/0095520 A1* | 4/2016 | Zhang | A61B 5/7242 600/407 |

OTHER PUBLICATIONS

Candes, Emmanuel J.; Romberg, Justin K. and Tao, Terence; Stable signal recovery from incomplete and inaccurate measurements, Communications on Pure and Applied Mathematics. (2006), 59 (8): 12071223; doi:10.1002/cpa.20124.

Gill, Patrick R.; Wang, Albert and Molnar, Alyosha; The In-Crowd Algorithm for Fast Basis Pursuit Denoising, IEEE Trans Sig Proc 59 (10), Oct. 1, 2011, pp. 4595-4605.

Qian, Pu and Frances, Bruce A.; Solution of a Wavelet Crime; Journal Article; Jun. 1998; 16 pages; Topics in Control and its Applications; Springer-Verlag.

Ashok, Amit and Neifeld, Mark A.; Compressive Light Field Imaging; Journal Article; Aug. 2010; 12 pages; Proceedings of SPIE; Bellingham, Washington.

Wang, Weig; Wainwright, Martin J.; and Ramchandran, Kannan; Information-theoretic limits on sparse signal recovery: Dense versus sparse measurement matrices; Journal Article; Jun. 2008; IEEE Transactions on Information Theory; vol. 56 Issue 6; Piscataway, NJ, USA.

Hassanieh, Haitham; Indyk, Piotr; Katabi, Dina and Price, Eric; Nearly Optimal Sparse Fourier Transform; Journal Article; Apr. 2012; STOC.

Tang, Gongguo; Bhaskar, Badri Narayan; Shah, Parikshit and Recht, Benjamin; Compressed Sensing off the Grid; Journal Article; Jul. 2012; IEEE Transactions on Information Theory.

Tan, Zhao; Tang, Peng and Nehorai, Arye; Joint Sparse Recovery Method for Compressed Sensing with Structured Dictionary Mismatches; Journal Article; Jul. 2014; pp. 4997-5008; IEEE Transactions on Signal Processing; vol. 62 Issue 19.

Letourneau, Pierre-David; Langston, M. Harper and Meister, Benoit; A sparse multidimensional FFT for real positive vectors; Journal Article; May 10, 2016; 37 pages.

Chen, Scott Shaobing; Donoho, David L and Saunders, Michael A.; Atomic Decomposition by Basis Pursuit; Journal Article; Aug. 2006; pp. 129-159; vol. 43 Issue 1; SIAM Review.

Ashok, Amit and Neifeld, Mark A.; Compressive Light Field Imaging with Weighted Random Projections; Journal Article; Sep. 2011; 8 pages; Proceedings of SPIE; Bellingham, Washington.

Mahalanobis, Abhijit; Kubala, Kenneth S.; Ashok, Amit; Petruccelli, Jonathan C. and Tran, Lei; Computational Imaging; Journal Article; Apr. 17-18, 2016; 8 pages; vol. 9870; Proceedings of SPIE; Bellingham, Washington.

Marcia, Roummel F. and Willet, Rebecca M.; Compressive Coded Aperture Video Reconstruction; Journal Article; Aug. 25-29, 2008; 5 pages; 16th European Signal Processing Conference; Lausanne, Switzerland.

Shi, Lixin; Hassanieh, Haitham; Davis, Abe; Katabi, Dina and Durand, Fredo; Light Field Reconstruction Using Sparsity in the Continuous Fourier Domain; Journal Article; Nov. 2014; vol. 34 Issue 1; ACM Transactions on Graphics; New York, New York, USA.

Rudelson, Mark and Vershynin Roman; Sparse reconstruction by convex relaxation: Fourier and Gaussian measurements; Article; Feb. 2006; Conference on information sciences and systems.

Marwah, Kshitij; Wetzstein, Gordon; Bando, Yosuke and Raskar, Ramesh; Compressive Light Field Photography using Overcomplete Dictionaries and Optimized Projections; Journal Article; Jul. 2013; 12 pages; vol. 32 Issue 4; ACM Transactions on Graphics; New York, New York, USA.

Babacan, Derin S.; Ansorge, Reto; Luessi, Martin; Mataran, Pablo Ruiz; Molina, Rafael and Katsaggelos, Aggelos K.; Compressive Light Field Sensing; Journal Article; Dec. 2012; vol. 21 No. 12; IEE Transactions on Image Processing.

Candes, Emmanuel and Becker, Stephen; Compressive Sensing: Principles and Hardware Implementations; Journal Article; 2013; 2 pages; Sensors.

Ashok, Amit and Neifeld, Mark A.; Compressive Imaging: hybrid measurement basis design; Journal Article; May 17, 2011; vol. 28 No. 6; J. Opt. Soc. Am. A.

Salahieh, Basel; Ashok, Amit and Neifeld, Mark; Compressive Light Field Imaging Using Joint Spatio-Angular Modulcation; Jun. 2013; 3 pages; Imaging and Applied Optics, OSA Technical Digest; Arlington, Virginia, USA.

Tang, Gongguo; Bhaskar, Badri, Narayan; Shah, Parikshit and Recfit, Benjamin. Compressive sensing off the grid. Article; Jul. 2012; 8 pages; arXiv preprint: 1207.6053.

Takhar, Dharmpal; Laska, Jason N.; Wakin, Michael B.; Duarte, Marco F.; Baron, Dror; Sarvotham, Shriram; Kelly, Kevin F. and Baraniuk, Richard G.; A New Compressive Imaging Camera Architecture using Optical-Domain Compression; Article; 2006; 10 pages; Proc. Computational Imaging IV at SPIE Electronic Imaging.

Tsaig, Yaakov and Donoho, David L.; Extensions of Compressed Sensing; Article; Oct. 22, 2004; 20 pages; Signal Processing.

Indyk, Piotr and Karalov, Michael.; Sample-Optimal Fourier Sampling in Any Constant Dimension; Article; Apr. 1, 2014; 25 pages; Foundations of Computer Science.

Howard, S.D.; Calderbank, A.R. and Searle, S.J.; A Fast Reconstruction Algorithm for Deterministic Compressive Sensing using Second Order Reed-Muller Codes; Article; 2008; 5 pages; Conference on Information Sciences and Systems.

Ashok, Amit and Neifeld, Mark A.; Compressive Imaging: hybrid projection design; Journal Article; Jun. 2010; paper IWD3; Imaging Systems OSA Technical Digest.

Berger, Christian, R.; Areta, Javier; Pattipati, Krishna and Willett, Peter; Compressed Sensing—A Look Beyond Linear Programming; Article; Aug. 2013; 4 pages; International conference on acoustics, speech, and signal processing.

Neff, Ralph and Zakhor Avideh; Dictionary Approximation for Matching Pursuit Video Coding; Article; 4 pages; 2010; International Conference on Image Processing.

Bergeaud, Francois and Mallat, Stephane; Matching pursuit of images; Article; 1996; pp. 1-16; Proceedings of SPIE.

Sarvotham, Shriram; Baron, Dror and Baraniuk, Richard G.; Sudocodes—Fast Measurement and Reconstruction of Sparse Signals; Article; 2006; 5 pages; Proc. IEEE Int. Symposium on Information Theory.

Park, Jae Young and Wakin Michael B.; A Multiscale Framework for Compressive Sensing of Video; Article; 2009; 4 pages; Picture Coding Symposium.

Tibshirani, Robert; Regression Shrinkage and Selection via the Lasso; Article; 1996; pp. 267-288; vol. 58 Issue 1. Journal of the Royal Statistical Society.

Huang, Gang; Jiang, Hong; Matthews, Kim and Wilford, Paul. Lensless Imaging by Compressive Sensing; Article, Sep. 2013; 5 pages; IEEE International Conference on Image Processing.

Chen, Jie and Chau, LAP-PUI; Light Field Compressed Sensing Over a Disparity-Aware Dictionary; Journal Article; 2015; IEEE Transactions on Circuits and Systems for Video Technology; DOI 10.1109/TCSVT.2015.2513485.

(56) References Cited

OTHER PUBLICATIONS

Lu, Hongtao; Long, Xianzhong and LV, Jingyuan. A Fast Algorithm for Recovery of Jointly Sparse Vectors based on the Alternating Direction Methods; Article; Jan. 2011; AISTATS.
Veeraraghavan, Ashok; Raskar, Ramesh; Agrawal, Amit; Mohan, Ankit and Tumblin, Jack; Dappled Photography: Mask Enhanced Cameras for Heterodyned Light Fields and Coded Aperture Refocusing; Article; 2007; 12 pages; International conference on computer graphics and interactive technique.
Wakin, Michael B.; A Manifold Lifting Algorithm for Multi-View Compressive Imaging; Conference Paper; Jun. 2009; IEEE Xplore Conference: Picture Coding Symposium; DOI: 10.1109/PCS.2009.5167356.
Jiang, Hong; Guang, Gang and Wilford Paul; Multi-view in lensless compressive imaging; Journal Article; Dec. 2014; pp. 1-10; vol. 3 e15; APSIPA Transactions on Signal and Information Processing; DOI: 10.1017/ATSIP.2014.16.
Huang, Liang-Chin; Asok Amit and Neifeld, Mark; Information Optimal Adaptive Measurement Design for Compressive Imaging; Journal Article; 2013; 3 pages; Imaging and Applied Optics.
Vaswani, Namrata and Lu, Wei; Recursive Reconstruction of Sparse Signal Sequences; Article; Sep. 2013; pp. 357-380; Signals and Communication Technology.
Ng, Ren; Digital Light Field Photography; Dissertation; Jul. 2006; 203 pages; Department of Computer Science Stanford University.
Wen, Zaiwen; Yin, Wotao; Goldfarb, Donald and Zhang, Yin; A Fast Algorithm for Sparse Reconstruction Based on Shrinkage Subspace Optimization and Continuation; Journal Article; Jun. 2010; SIAM Journal on Scientific Computing; DOI 10.1137/090747695.
Yu, Jingyi and McMillan, Leonard. Scam Light Field Rendering; Article; 2002; 32 pages; Pacific conference on computer graphics and applications.
Sen, Pradeep; Darabi, Soheil and Xiao, Lei; Compressive Rendering of Multidimensional Scenes; Book Article; 2011; pp. 152-183; vol. 7082; Video Processing and Computational Video.
Wang, Tianyun; Lu, Xinfei; Xi, Zhendong and Chen, Weidong; A Fast and Accurate Sparse Continuous Signal Reconstruction by Homotopy DCD with Non-Convex Regularization; Journal Article; Mar. 2014; vol. 14; pp. 5929-5951; Sensors; Doi:10.3390/s140405929.
Si, Weijian; Qu, Xinggen, Qu and Qu, Zhiyu; Off-Grid DOA Estimation Using Alternating Block Coordinate Descent in Compressed Sensing; Journal Article; Aug. 2015; vol. 15; pp. 21099-21113; Sensors; Doi:10.3390/s150921099.
Luitkus, Antoine; Martina, David; Popoff, Sebastien; Chardon, Giles; Katz, Ori; Lerosey, Geoffroy; Gigan, Sylvain; Daudet, Laurent and Carron, Igor; Imaging With Nature: Compressive Imaging Using a Multiply Scattering Medium; Journal Article; Jul. 2014; 7 pages; vol. 4 Issue 5552; Scientific Reports.
Gilbert, Anna and Indyk, Piotr; Sparse Recovery Using Sparse Matrices; Journal Article; 2010; 10 pages; Proceedings of the IEEE.
Tropp, Joel A. and Gilbert, Anna; Signal Recovery From Random Measurements Via Orthogonal Matching Pursuit; Journal Article; Dec. 2007; pp. 4655-4666; vol. 53 No. 12; IEEE Transactions on Information Theory.
Korean Intellectual Property Office; International Search Report; dated Jan. 23, 2017.
Korean Intellectual Property Office; Written Opinion of the International Searching Authority; dated Jan. 23, 2017.
Candes, Emamnuel J.; Compressive Sampling; Journal Article; 2006; 20 pages; Proceedings of the International Congress of Mathematicians; Madrid, Spain.
Wakin, Michael B.; Laska, Jason N.; Duarte, Marco F.; Baron, Dror; Sarvotham, Shriram; Takhar, Dhampal; Kelly, Kevin F. and Baraniuk, Richard G.; Compressive Imaging for Video Representation and Coding; Conference Paper; Apr. 2006; Proceedings of the Picture Coding Symposium (PCS); Bejing, China/.
Xu, Weiyu and Hassibi, Babak; Efficient Compressive Sensing with Deterministic Guarantees Using Expander Graphs; Journal Article; 2007; 6 pages; IEEE Transactions on Information Theory.
Isaksen, Aaron; Mcmillan, Leonard and Gortler, Steven J.; Dynamically reparameterized light fields; Conference Paper; Jul. 2000; pp. 297-306; In Proceedings of the 27th annual conference on Computer graphics and interactive techniques (SIGGRAPH 2000); New Orleans, Louisiana.
Veeraraghavan, Ashok; Agrawal, Amit; Raskar, Ramesh; Mohan, Ankit and Tumblin, Jack; Non-Refractive Modulators for Encoding and Capturing Scene Appearance and Depth; Article; Jun. 2008; 8 pages; Computer vision and pattern recognition.
Park, Jae Yong and Wakin, Michael B.; A geometric approach to multi-view compressive imaging; 2012; 15 pages; EURASIP Journal on Advances.
Perwass, Christian and Wietzke, Lennart; Single Lens 3D-Camera with Extended Depth-of-Field; Article; Feb. 2012; vol. 8291; Human Vision and Electronic Imaging XVII; Burlingame, California; Doi:10.1117/12.909882.
Candes, Emmanuel J., Romberg, Justin K., Tao; Terence Stable signal recovery from incomplete and inaccurate measurements, Communications on Pure and Applied Mathematics. (2006), 59 (8): 12071223; doi:10.1002/cpa.20124.
Gill, Patrick R.; Wang, Albert; Molnar, Alyosha; The In-Crowd Algorithm for Fast Basis Pursuit Denoising, IEEE Trans Sig Proc 59 (10), Oct. 1, 2011, pp. 4595-4605.
Adelson et al., "Single Lens Stereo with a Plenoptic Camera," IEEE Transactions on Pattern Analysis and Machine Intelligence, vol. 14, No. 2, 8 pages, Feb. 1992.
Xu et al., "High-resolution lightheld photography using two masks," Optics Express, vol. 20, No. 10, pp. 10971-6080, May 7, 2012.
Ashok et al., "Compressive light field imaging," Proceedings of SPIE, vol. 7690, Apr. 23, 2010.

\* cited by examiner

HOLOGRAPHIC LIGHT FIELD IMAGING DEVICE AND METHOD OF USING THE SAME

CROSS-REFERENCE TO RELATED APPLICATIONS

This Patent Application claims the benefit of U.S. Provisional Patent Application No. 62/239,799, filed on Oct. 9, 2015, titled "Holographic Light Field Imaging Device And Method Of Using The Same", by inventors Ryan Althoff Damm and Kris Somboon Chaisanguanthum, the contents of which are expressly incorporated herein by this reference as though set forth in their entirety and to which priority is claimed.

FIELD OF USE

The present disclosure relates generally to imaging devices, and more specifically, to imaging devices that capture a holographic light field.

BACKGROUND

Traditional cameras only capture imagery from a single, fixed perspective—the location of the camera lens's entrance window, which is the image of the aperture through the front of the lens. Light enters the camera lens, passes through the aperture, and forms an image, generally on a light-sensitive medium that records the image. Each pixel or region in the resulting recorded image represents all the light collected at that point on the sensor or film, and creates an image from the perspective of the lens's aperture.

In order to serve multiple views (as required for virtual reality, augmented reality, or holographic displays), the source imagery must contain multiple perspectives. One approach to capturing multiple perspectives may be to utilize an array of cameras, for example, each capturing a single perspective. Interpolating the view between cameras, however, may produce errors and may fail to capture specularity and proper parallax. Importantly, any approach that utilizes multiple camera lenses will under-sample and alias the light field, because the cameras are not continuous and the lens's apertures block out some of the light. There is an unfortunate tradeoff between fidelity of the light field reconstruction and the number of cameras required to capture the light field, and holographic imaging with arrays of cameras is impractical with today's camera technology. Additionally, other drawbacks to array-based capture solutions include high data rates, the requirement to synchronize camera elements, and the like.

Thus, there is a need for a device and method for capturing a holographic light field. The device may be an imaging device that seeks to sample the entire light field—all or most of the light that strikes an extended surface—in order to recreate any possible view that may be seen through that surface. A light field generally represents a large amount of potential data, although the light field may be substantially redundant. Preferably, this imaging device may optically alter a light field in order to capture it with significantly less data and reconstruct it with little to no error while sampling the entire light field.

SUMMARY

To minimize the limitations in the cited references, and to minimize other limitations that will become apparent upon reading and understanding the present specification, the present specification discloses a new and improved holographic light field imaging device.

One embodiment may be a holographic light field imaging device comprising: a refractive surface; one or more occluding masks; a dielectric spacer; a diffuser; a relay lens; and an area scan digital light sensor. The refractive surface and occluding masks convolve the incident light field with a measurement function, and the resulting image captured by the light sensor represents a statistical sampling of the light field. The image itself is not photographic; it cannot be viewed directly as a meaningful image. Instead, it is the raw material for an algorithmic reconstruction, which effectively inverts the convolution and dimension-reducing projection of the optics, to recover a representation of the original light field. This is only possible because light fields are substantially redundant.

It is known that light field data is highly redundant, and therefore compressible. One object of this light field imaging device is to move this compression step into the optics, performing compression cheaply in the analog domain, and allowing for digital reconstruction in software. Naturalistic light fields are known to have sparse (in a mathematical sense) descriptions, such as wavelet or spatial frequency domains. This is intuitive in view of how little a given scene changes as you move your perspective. This is also why array cameras are relatively inefficient at light field capture: the adjacent cameras are capturing a substantially similar view of the scene. The pixels in the image from each camera in the array are highly correlated with each other and with those of adjacent cameras, making them relatively redundant measurements. Correlated measurements are necessarily capturing less new information about the signal. By transforming the light field with the optics, this present imaging device allows each pixel on a single sensor to be more statistically independent of the other pixels, resulting in a much more efficient sampling of the light field.

Each pixel in the resulting compressed image represents a substantially independent measurement of the scene. The entropic image on the digital sensor can then be used as the input to a reconstruction algorithm, which uses each independent measurement to recover the sparse signal. The reconstruction algorithm may be an optimization over both the entropic image data and the sparsity of the recovered signal. In other words, the algorithm attempts to find the signal that best reflects the entropic image while imposing the constraint that the signal obey known statistics of naturalistic light fields, notably their sparsity. Optimization algorithms may be used to solve this reconstruction problem, including, but not limited to, atomic norm minimization, gradient descent, and stochastic gradient descent, among others. This reconstruction problem is well-posed problem: it is known mathematically that, for a sufficiently rich measured signal, the reconstruction obtained this way is asymptotically unique, and thus can be made satisfactorily accurate.

It is an object to overcome the limitations of the prior art.

It is an object to reduce the number of sensors required to image a light field and reduce aberrations due to the non-continuous sampling of light fields in an array of traditional cameras.

One embodiment may be a holographic light field imaging device, comprising: at least one compression array; at least one image sensor; wherein light striking the at least one compression array creates an incident light field; wherein the incident light field is passed through the at least one compression array, such that the incident light field is reduced from a four-dimension representation to a two-dimension representation, such that a dimensionally-reduced light field is created; and wherein the two-dimension representation of the dimensionally-reduced light field is recorded by the image sensor, such that one or more reduced two-dimensional images are created. The one or more reduced two-dimensional images may be processed by a computing device, which comprises a reconstruction algorithm that inverts the one or more reduced two-dimensional images to reconstruct the incident light field. The at least one compression array may comprise a first surface; wherein the first surface may be a refractive surface that exhibits locally-positive curvature to increase a spatial entropy of the dimensionally-reduced light field. The first surface may project the incident light field to increase the spatial entropy of the dimensionally-reduced light field. The first surface may comprise one or more diffractive-scale features to transform the incident light field to increase the spatial entropy of the dimensionally-reduced light field. A first surface of the at least one compression array may alternatively be substantially flat and constructed of a transparent dielectric material. The reconstruction algorithm may reconstruct the incident light field in or via a sparse basis. The sparse basis may be constructed from one or more of the following bases, consisting of: a Fourier domain; a wavelet domain; and a sparse dictionary. The at least one compression array may comprise a substantially random pattern of occlusions. The substantially random pattern of occlusions may be described by an emissions matrix that informs a reconstruction algorithm.

One embodiment of the device may be a holographic light field imaging device, comprising: at least one compression array; at least one image sensor; wherein the at least one compression array may comprise one or more encoding masks and a first surface; wherein light striking the first surface may create an incident light field; wherein the incident light field may be passed through the one or more encoding masks, such that the incident light field may be reduced from a four-dimension representation to a two-dimension (i.e., planar image) representation, such that a dimensionally-reduced light field may be created; wherein the two-dimension representation of the dimensionally-reduced light field may be recorded by the image sensor, such that one or more reduced two-dimensional images may be created; and wherein the one or more reduced two-dimensional images may be processed by a computing device, which comprises a reconstruction algorithm that may invert the one or more reduced two-dimensional images to reconstruct the incident light field, either in part or in whole. The first surface of the system may transform the incident light field to maximize a spatial entropy of the dimensionally-reduced light field. The first surface may be substantially flat and constructed of a transparent dielectric material. The transparent dielectric material may be glass or plastic. The first surface may be a refractive surface that exhibits locally-positive curvature to increase the spatial entropy of the dimensionally-reduced light field. The first surface may comprise one or more diffractive-scale features to transform the incident light field to increase the spatial entropy of the dimensionally-reduced light field. The reconstruction algorithm may reconstruct the incident light field in a sparse basis. The sparse basis may be selected from one or more of the following bases, consisting of: the Fourier domain; a wavelet domain; a sparse dictionary; or a hybrid approach that combines bases. The one or more components of the compression array may be selected with the purpose of selectively transforming the incident light field in a calculable way. The one or more encoding masks may comprise a substantially random pattern of occlusions, wherein the substantially random pattern of occlusions may be described by an emissions matrix that informs the reconstruction algorithm. The transforming of the incident light field may be selected from the group of transformations consisting of at least one of: attenuation, refraction, diffraction, and occlusion. The first surface has a diameter that may be greater than 0.75 meters and does not have an objective lens. The compression array may further comprise a diffuser. The image sensor may comprise a relay lens and a digital light sensor. The diffuser may scatter the dimensionally-reduced light field in a substantially random manner, such that a diffused and dimensionally-reduced light field may be created. The relay lens may relay the diffused and dimensionally-reduced light field to the digital light sensor.

Another embodiment of the device may be a holographic light field imaging device, comprising: at least one compression array; at least one image sensor; at least one housing; wherein the at least one compression array may comprise one or more encoding masks, one or more dielectric spacers, a diffuser, and a refractive surface; wherein light striking the refractive surface may create an incident light field; wherein the incident light field may be passed through the one or more encoding masks and one or more dielectric surfaces, such that the incident light field may be reduced from a four-dimension representation to a two-dimension representation, such that a dimensionally-reduced light field may be created; wherein the refractive surface may comprise a locally-positive curvature to increase a spatial entropy of the dimensionally-reduced light field; wherein the diffuser may scatter the dimensionally-reduced light field in a substantially random manner, such that a diffused and dimensionally-reduced light field may be created; wherein the image sensor comprises a relay lens and a digital light sensor; wherein the relay lens relays the diffused and dimensionally-reduced light field to the digital light sensor; wherein the housing may substantially prevent stray light from being relayed to the digital light sensor; wherein the two-dimension representation of the diffused and dimensionally-reduced light field may be recorded by the digital light sensor, such that one or more reduced two-dimensional images may be created; and wherein the one or more reduced two-dimensional images may be processed by a computing device, which may comprise a reconstruction algorithm that inverts the one or more reduced two-dimensional images to reconstruct the incident light field. The at least one compression array may be two or more compression arrays and the at least one image sensor may be one image sensor. The at least one compression array may be one compression array and the at least one image sensor may be two or more image sensors. The holographic light field imaging device may be combined with one or more holographic light field imaging devices of a similar design.

Other features and advantages inherent in the system and method for holographic light field capture claimed and disclosed will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

Figure 1:
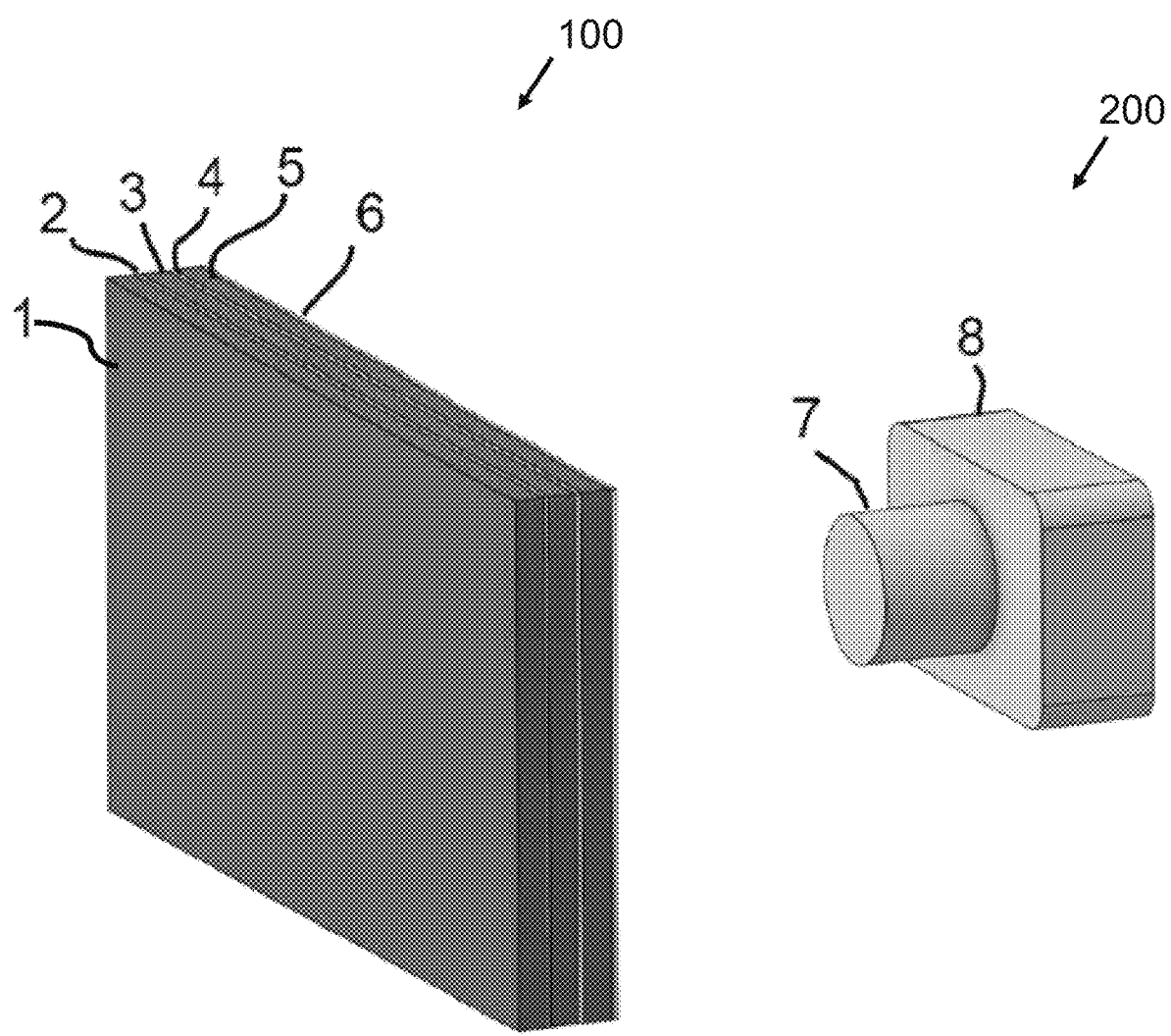
FIG. 1 is an illustration of one embodiment of the holographic light field imaging device.

In the following detailed description of various embodiments, numerous specific details are set forth in order to provide a thorough understanding of various aspects of the embodiments. However, these embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

As used herein, the term "entropic image" refers to a non-photographic image that is substantially entropy-increasing, i.e., the individual pixels or regions in the image show a lower correlation with one another across the holographic signal space than pixels in a traditional image. The entropic image might look like a noisy, blobby image for most input light fields. Preferably, the pixels in the entropic image may be arbitrary combinations of light field measurements. High-fidelity light field reconstruction is encouraged by optical stack design, e.g., one designed to generate higher entropy images (in the information theoretic sense).

As used herein, "input light field(s)" refers to the incident light across the incident (typically refractive) surface of the compression array. The input light field is the set of all light rays that are incident on the front surface that are desired to sampled (some of the light is rejected that is outside the desired field of view; those light rays are generally not part of the input light field).

As used herein, the term "holographic signal space" refers to the vector space that contains all possible input light field signals. Although a rasterized planar image is two-dimensional, the dimension of the image space is the resolution of the image, as the vector representing an image describes each pixel as a separate (mathematical) dimension. This signal-processing definition of 'dimension' is distinct from spatial and angular dimensions, and the use should be apparent from context. In the analog regime, the holographic signal space is a very large space. Preferably its dimensionality is bounded because of assumptions around band-limits on the input, and generally represents any value a holographic light field could take (and not merely naturalistic ones). The boundaries of a signal space are typically determined partly by assumptions about maximum values of the signal, as well as by the choice of parameterization. This choice of parameterization includes decisions about bounds, quantization, and/or rasterization, which have implications both for signal space size and the sparsity of a given signal's representation. Signal spaces are very large, and much of the signal space corresponds to uninteresting or physically-unlikely inputs. A signal space may also be the set of all possible light fields; this is a more algebraic, set-theoretic way of stating the above. The precise choice of rasterization and parameterization is not dictated by the device, and the reconstruction need not require rasterization to work (i.e., the reconstruction can be performed in a continuous basis).

As used herein, the term "rasterize" or "rasterization" refer to translating a continuous signal into a quantized signal on a grid or raster. In the case of a light field, a rasterized signal may comprise a series of values for each quantized bin in a four-dimensional flux, for example, parameterized as two linear spatial dimensions and two angular dimensions. This example is only one of many ways to do this. In this case, a single four-tuple might specify a ray bundle incident at a particular location and with a particular ray direction (the angular extent of the ray bundle is implied by the size of the bin: how distant the next bin is in angular and spatial distance). In an entropic image or two-dimensional photographic image, a 'rasterized' signal may be one with two spatial dimensions, such as the 'x' and 'y' values that specify an individual pixel in a pixel-based image.

As used herein, the term "spatial values" refers those variables that correspond to physical spatial dimensions, which for example can be specified in linear measurements of distance: millimeters, centimeters, or even pixels (which correspond to physical locations on a sensor). For example, the 'x' and 'y' values in a rasterized light field may correspond to the location in a reference plane that the light field is passing through—such that all light ray bundles that pass through the particular position x1, y1 with at any angle share the same spatial value at that reference plane. They might diverge from one another, and may have different spatial values at different reference planes. This definition is independent of parameterizations, and may include polar coordinates, radial coordinates, etc. without loss of generality.

As used herein, the term "angular values" refers to the values of variables describing the angle of incidence of a ray bundle at a reference plane. These may be denoted by a number of different variable names (and different parameterizations). Two common representations may be 'altitude and azimuth,' describing angular offsets (and which can correspond to latitude and longitude) and 'two plane parameterization', in which a ray direction may be specified by two points on adjacent reference planes (i.e., the line connecting points (x1, y1) and (x2, y2)). The two may be mathematically equivalent, and any reference to angular values might include any possible parameterization.

As used herein, the terms "compression array", "compressive stack", or "optical stack" refers to an optical device to manipulate an incident light field such that each region on a reference plane represents a dimensionally-reduced series of independent measurements of the light field signal space. Any arrangement of spacers, masks, refractive or diffractive surfaces that manipulates the light field in a known and calculable way that, when paired with a reconstruction algorithm, can recover a reconstruction of the original light field, may qualify. The exact order and precise design of any masks, refractive surfaces, and diffractive surfaces is immaterial, provided the optical path is properly described in the reconstruction algorithm. The optical stack preferably reduces the size of the signal space of the input light field, such that it can be described by fewer measurements and less data than the entire incident field. This may be accomplished, in one embodiment, by a diffusive surface, which projects the four-dimensional light field into a two-dimensional entropic image. The other optical manipulations preferably occur in the light path preceding the diffusive surface, and serve to combine rays of light into composite measurements at the diffusive plane. The composite measurements may be a linear combination of a plurality of discrete ray bundles, and may provide a means for reconstructing the light field in a sparse basis.

As used herein, the terms "mask", "occluding mask", and/or "encoding mask" refer to a structure, typically made from ink, liquid crystal (for time-varying masks), or other occlusive media that can absorb light, and that may have a random or pseudo-random pattern of occlusions. The occlusions may be described by an emissions matrix that informs the reconstruction algorithm, which is the algorithm used to reconstruct the four dimensional light field from the two dimensional recorded image. The mask may be time-varying. The mask pattern may be dynamically determined by an on-the-fly basis and/or based on a plurality of inputs, including subject matter and bandwidth requirements. The mask may be attenuating, in that it reduces the light field passing through a given obstruction rather than eliminating it entirely. The mask may be occlusive, in that it blocks part of the light field, and may operate on different wavelengths differently (in other words, the various parts of the stack may be dispersive, in the optical sense of the word, or may have bandpass, low-pass, or high-pass characteristics).

As used herein, the term "sparse basis" refers to a choice of signal representation wherein signals of interest (naturalistic light fields) can be represented by a relatively small number of non-zero values. Among different bases that describe the same (size) signal space, often, some bases represent signals of particular interest with a smaller amount of data. This fact of sparse representations underlies much of modern image compression, which is why traditional, two-dimensional images and video can be compressed more than arbitrary data. The sparse basis may live in a Hilbert space (or an infinite-dimensional Hilbert space).

FIG. 1 is an illustration of one embodiment of the lens array, and one embodiment of the image sensor for the holographic light field imaging device. As shown in FIG. 1, one embodiment of the optical compression array 100 may comprise: a refractive surface 1, occluding mask 2, dielectric spacer 3, second occluding mask 4, dielectric spacer 5, and diffuser 6. The refractive surface 1 may exhibit local positive curvature to increase the independence of each measurement, though this is not required. The refractive surface 1 may also function diffractively without loss of generality. FIG. 1 also shows that the image sensor 200 may comprise a relay lens 7 and an area scan digital light sensor 8. The relay lens 7 and an area scan digital light sensor 8 are one example of a device that may be used for sampling the light field at the back of the compressive array 100, sometimes referred to as a compressive stack. The diffuser 6 scatters the light so that the relay lens 7 and area scan digital light sensor 8 to avoid limitations of etendue. There may be as few as one mask 4 or more than three masks 4. Preferably there are two masks 4 and an equal number of spacers 5.

The present holographic light field imaging device preferably does not have a single objective lens; instead, it generally has a compressive stack of optical components to manipulate the wavefront in a calculable way (typically referred to as the optical compression array 100). Ideally the optical compression array 100 is usually a literal stack of glass and opacity masks, though it may include curved surfaces (particularly the front surface), gaps with different refractive indices, or even diffractive or reflective components.

The refractive surface 1 of the optical compression array 100 may be a physically large surface that defines a light capture window. This extended surface 1 may be expressed on a scale of meters as compared to standard lens apertures, which are typically measured in millimeters in diameter. The light that strikes the extended surface 1 may generally be distorted, attenuated, and transformed by the optical compression array 100 before being integrated into a two-dimensional image. The preferred way for the light field to be integrated is usually by scattering, for example with an optical diffuser 6, which may be ground glass or a holographic diffuser plate. This avoids limitations of etendue and the working f-number of the relay system 7.

The image that is then captured on the image sensor 200, preferably via traditional relay optics, such as the relay lens 7, by the area scan digital light sensor 8. The area scan digital light sensor 8 may be in direct contact with the compression array 100. Indeed, it is an object of the present system to have a configuration that optimizes the conversion of the average illumination that reaches the back of the compressive array 100 into a useable digital signal.

The resulting digital image file that is relayed to and then created by the sensor 8 preferably contains an optically-encoded representation of the entire light field that strikes the refractive surface 1, though this representation is transformed and is of a considerably smaller data size than an uncompressed representation, and requires fewer pixels (per solid angle) to measure the signal.

By sampling all the light that strikes the surface 1, the present holographic light field imaging device may capture every possible perspective simultaneously. This is done by projecting the four-dimensional (4D) light field (two dimensions of position in the window and two dimensions of angular direction) into an encoded two-dimensional (2D) image. The 2D image is not a photographic image, but is instead a projection of the incident light field. That encoded 2D image may then be captured by digital light sensor 8.

The reduction of dimensionality means the light field originally incident on the surface is compressed, and all of the theoretical four-dimensional original light fields cannot be reconstructed without some ambiguity. But, the light field transformation may be accomplished such that other constraints on the reconstruction might lead to a perfect or near-perfect reconstruction of naturalistic looking scenes, which is primarily done by eliminating redundant information in the compressed light field, and capturing the light field and information/data related to the light field in an efficient format. (Note that the projection may also accomplish a degree of low-passing of the input light field, due to the finite size of the optical elements and the rasterization of the two-dimensional recording device. This low-passing is desirable, and places bounds on the size of the recovered signal at the expense of very high frequency fidelity.).

The captured and compressed representation may then be used by a computer system connected to or available to the imaging device to reconstruct the original representation of light field, by effectively inverting the projective, compressive transform of the light field and recovering a highly accurate reconstruction of the incident light field in a transformed basis. That inversion can take many algorithmic forms, and can incorporate other constraints or prior information (such as data about the structure of natural light fields, data about the particular artificial light field being captured, and/or the particular light field that the data represents, including imagery from another camera or camera system, or reconstructions of the same light field earlier or later in time).

Light fields are usually very redundant, and that redundancy allows the data representing a given light field to be compressible. The algorithms used to compress or invert may generally leverage the natural compressibility/sparsity in some representation of the light field (for example, the Fourier domain, carefully chosen wavelet domains, discrete cosine transform spaces, pre-computed dictionary basis, or other basis) to reconstruct it unambiguously.

An algorithm that captures the prior assumptions may then alter the uncompressed light field representation until it fulfills the prior assumptions and matches the captured, coded light field either maximally well (given constraints) or within some error threshold. The reconstruction generally takes the form of an optimization—searching the signal space for a representation that best matches the sampled data—while imposing the constraint that the recovered signal is sparse. This constraint can be imposed as soft constraint (e.g., lasso regression, conjugate gradient descent), or as a hard constraint (e.g., matching pursuit). There exists many asymptotically equivalent methods.

By sampling the entire surface of a light field, the compressive holographic camera will preferably ensure sampling of all possible perspectives and all directions, while allowing full signal reconstruction (for scenery with certain properties) or bounded-error reconstruction (for incompressible scenes). Incompressible scenes would include light fields that violate the sparsity assumption, or exist in portions of the signal space that are difficult to recover unambiguously.

In some embodiments, an external structure may limit the extent of the input light field by rejecting light outside the desired field of view, such as an egg crate that may be fitted over the surface 1 or over the diffuser 6.

Figure 2:
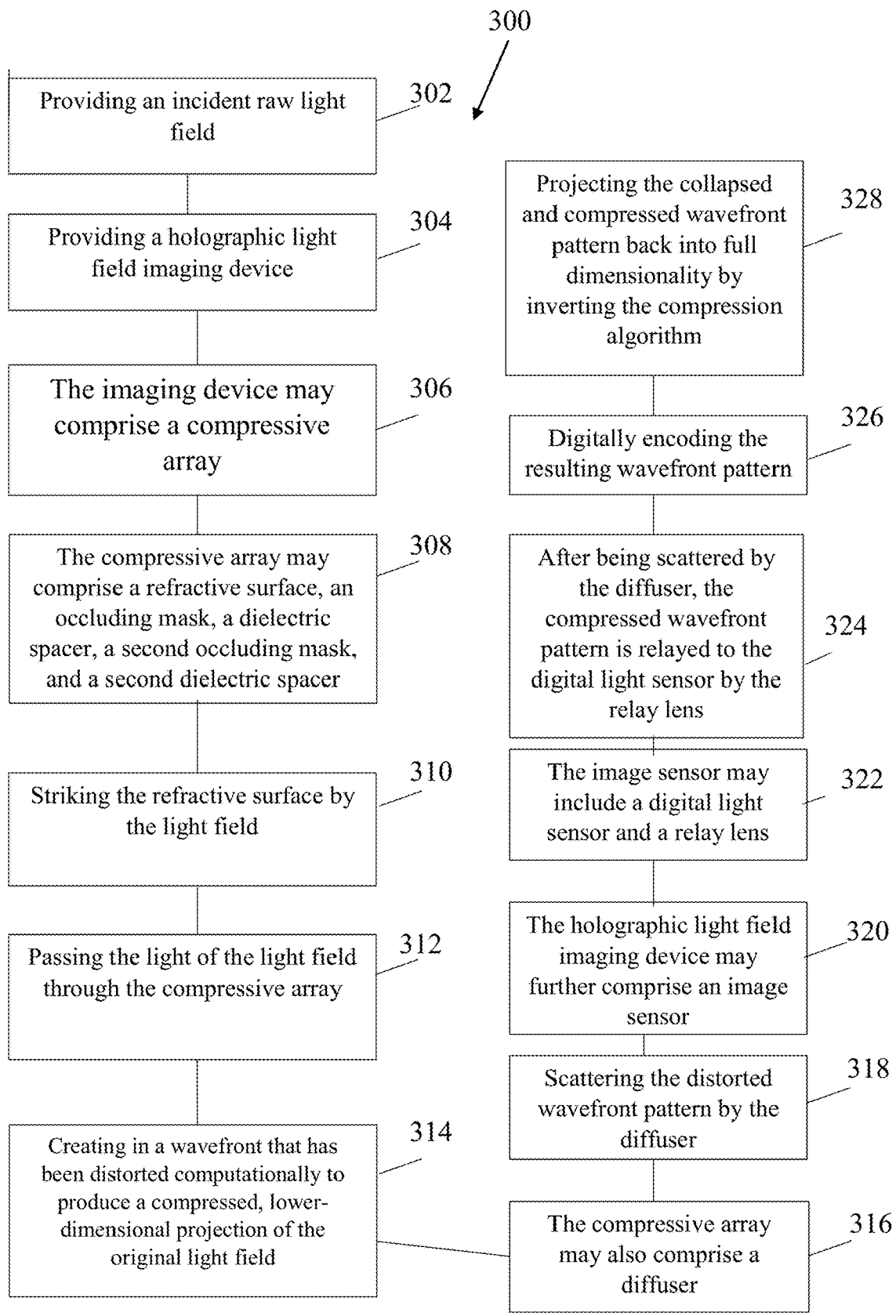
FIG. 2 is a flow block diagram of one embodiment of the method of using the holographic light field imaging device.

FIG. 2 is a block diagram of one embodiment of the method of using the holographic light field imaging device. As shown in FIG. 2, the method 300 may comprise the steps: providing an incident raw light field 302; providing a holographic light field imaging device 304; and the imaging device may comprise a compressive array, which may comprise a refractive surface, an occluding mask, a dielectric spacer, a second occluding mask, and a second dielectric spacer 308. During operation, the incident light field may strike the refractive surface 310 and pass through the occluding mask, the dielectric spacer, second occluding mask, and dielectric spacer 312. This may result in a wavefront that has been distorted computationally to produce a compressed, lower-dimensional projection of the original light field 314. The compressive array preferably includes a diffuser 316. The resulting wavefront is now a wavefront pattern is then preferably scattered by the diffuser 318. The holographic light field imaging device may further comprise an image sensor 320. The image sensor may include a digital light sensor and a relay lens 322. After being scattered by the diffuser, the compressed wavefront pattern is relayed to the digital light sensor by the relay lens 324. The resulting wavefront pattern may also be digitally encoded 326. The resulting digital record of the collapsed and compressed wavefront may then be projected back into full dimensionality by inverting the compression algorithm as described herein above 328. The resulting reconstructed waveform will preferably have high fidelity and well-bounded error, without aliasing.

The holographic light field imaging device preferably functions by the following: The refractive, occluding, and dielectric plates generally comprise an optical stack (the compressive stack or the compression array) that preferably distorts the light field (also called the wavefront, or incident light field). This preferably produces a radiance pattern (or wavefront pattern) that represents a holographic projection of the four-dimensional (4D) light field incident on the refractive surface down to a 2D image on the back of the diffuser 6. This image is preferably not a traditional image, but instead is a coded pattern that embeds the 4D function onto the 2D surface by convolving it with an emissions function. The emissions function may be either (1) pre-calculated, and it is determined by the exact distortion of the optical stack on the state space of the 4D light field, or (2) it can be post-calculated by calibrating the system with known inputs). The resulting compressed image will look substantially like a shadow-pattern on the back of the diffuser (as shown in FIG. 14b), and encodes much of the entropy of the input light field. The masks 2, 4 and refractive surface 1 may scramble the input light field, and if the optical system is properly designed, may create a forward-calculable (and invertible) projection of any input light ray bundle into a multiplicity of points on the back of the diffuser. This projection is only invertible by virtue of the present image device and related system and methods.

Preferably, the distortion of the light field by the compression array effectively compresses the input signal (the incident light field), while discarding substantially redundant information. It does this optically, before sampling by the image sensor 200.

The resulting 2D image is preferably relayed and imaged on the sensor by one or more relay lenses 7, which may transmit the image to one or more digital sensors 8. The 2D projective image may then be stored, transmitted, and copied like any other 2D digital image file. Through knowledge of the measurement function, the 4D light field (image) may be reconstructed from the 2D coded image. To reconstruct the original signal, the recorded 2D projective image may then be passed to an error-minimizing optimization algorithm, which may include reference to traditional, photographic 2D images captured alongside the coded image, as well as comparison to the original coded image.

During reconstruction, the compressed representation of the wavefront may be projected back into the full light field signal space, and an error calculation may be performed (possibly with comparison to other reference images). Then an error-minimizing algorithm may follow a gradient descent or other optimization routine to find a reconstruction that minimizes both error and sparsity of the reconstructed light field. This iterative loop may continue until the error is below a threshold, or has reached a stable value and/or a sparsity constraint is satisfied and/or some other pre-defined termination condition.

Once error has been sufficiently minimized and the sparsity and other conditions are met, and the light field is fully reconstructed, it can then be compressed in normal data fashion for storage, transmittance, and display. This includes entropy encoding as well as lossy and lossless coding.

In one embodiment, the holographic light field imaging device may be constructed by first creating the desired emissions model. This may be performed from first principles or empirically (via simulation or physical testing). The goal is to preferably create a wavefront distortion that scrambles the wavefront into a random or pseudo-random basis for later reconstruction.

The emissions model may dictate the features to be included in the compressive stack 100: the curvature(s) of the refractive surface(s) 1 (if any), the shapes and opacity of the occluding mask(s) 2, 4 and the thicknesses of the dielectric plates 3, 5 (which serve to separate the refractive surface 1 and occluding masks 2, 4 by a calculated distance). The refractive surface 1 may include glass, plastic, or other dielectric, and may include thin-film coatings. The occluding mask 2, 4 may be printed with ink, fabricated from an opaque or reflective material, or use polarization to attenuate the wavefront (for example, it can be an LCD panel for a time-varying mask).

Once the compressive stack 100 is assembled, a recording camera may be placed behind the stack 100, with a relay lens 7 that faithfully transmits the image from the back of the diffuser 6 to the camera's sensor 8. The relay lens 7 would ideally be aberration-free, but relay distortions can also be incorporated into the model and algorithms.

In addition to the physical camera (100 and 200), a reconstruction algorithm may be used to reconstruct the original light field. The algorithm may be a function of the original emissions model, and projects the 2D image back into 4D (though not necessarily the same basis as the original, and ideally in a basis where the recovered signal is likely to be sparse). As the effect of the stack is projective, the reconstruction is necessarily ambiguous unless it includes other constraints, such as sparsity in the reconstruction or fidelity to additional reference images, imposed.

In order for the technique to work, the compression array generally is configured to scatter and encode the light field enough to project it into another basis—each recorded pixel must contain substantially different information about the incident light field. But, the first surface need not have any curvature; the dielectric barrier between surfaces may be constructed of plastic, glass, dielectric fluid like microscopy oil, or even air (or vacuum). There does not need to be a multiplicity of masks, and even a maskless camera could be effective with careful construction of the refractive surface (s).

The relay lens and sensor may be necessary to project the image onto a small silicon sensor or other photosensor, but may not be necessary if the sensor is the same size as the light field being imaged, in which case this large sensor may take the place of the diffusion plate at the back of the optical stack.

In order to create images, a user may operate the holographic light field imaging device similar to a regular digital camera: turn it on, point it at a scene of interest, and record. There may be a calibration step, but this is generally not necessary.

Once the optically compressed image has been captured, the user may move, copy, stream, and back up the digital file as would normally be done. To view that digital file, however, the user may generally be required to run a software pass to reconstruct the original light field. Once this has been reconstructed, they can use the resulting light field in any existing display that supports light fields—like virtual reality headsets, augmented reality headsets, or volumetric/holographic displays.

The precise number and order of masks, refractive surfaces and diffusing elements may not be important for the technique to work, and may be re-ordered without substantially changing the effectiveness of the system.

The images captured may be still or video feed images.

Figure 3:
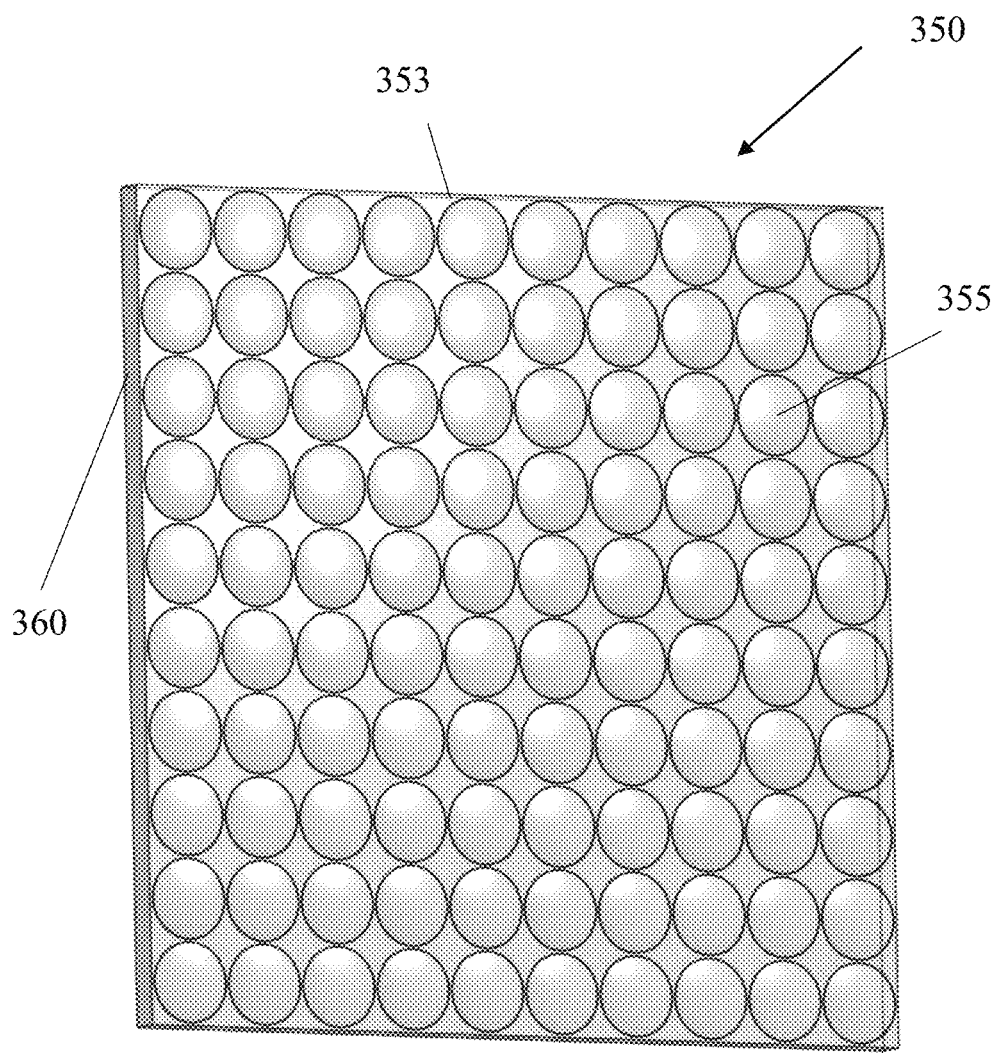
FIG. 3 is an illustration of one embodiment of a compression array and top surface of one embodiment of a holographic light field imaging device.

FIG. 3 is an illustration of one embodiment of a compression array and top surface of one embodiment of a holographic light field imaging device. As shown in FIG. 3, the compression array 350 may have a front surface 353 that has one or more lenslets 355. Each lenslet 355 may be a single plano-convex positive singlet lens. The lenslet 355 may also be a Fresnel lens, a diffractive surface, a refractive surface, or a flat surface. If a flat surface, the lenslets 355 would not shuffle the light rays of the incident light field. Although FIG. 3 shows a square compression array 350 with numerous lenslets 355, the compression array may be any shape and have one or many more lenslets 355 than shown.

The surface 353 is preferably on top of the rest of the compression array 360 though this is not required. As shown the surface 353 may be discontinuous.

FIG. 3 shows that the front surface, which is sometimes called the first surface, may be a refractive surface that exhibits locally-positive curvature to increase the spatial entropy of the dimensionally-reduced light field.

Figure 4:
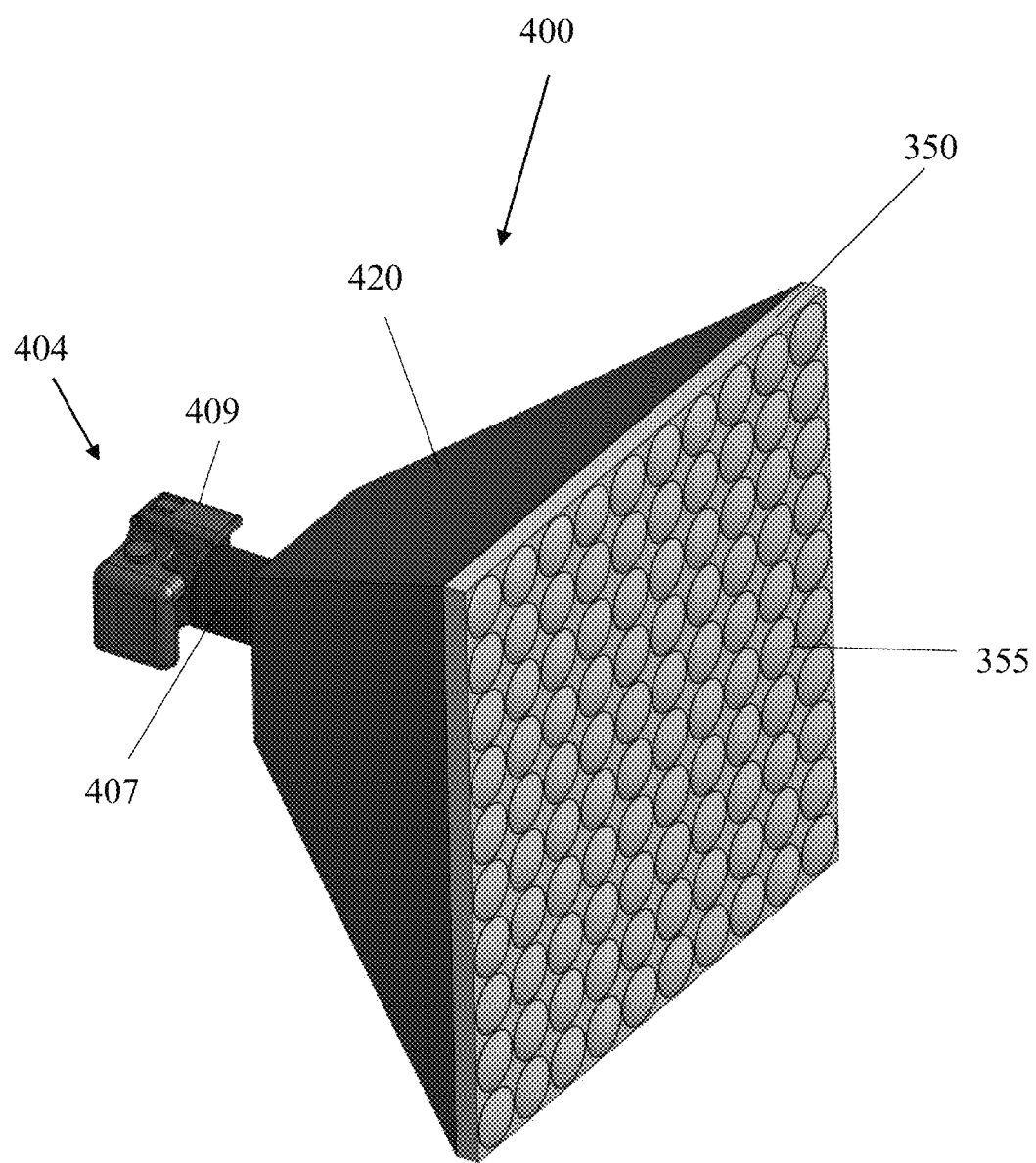
FIG. 4 is an illustration of one embodiment of a holographic light field imaging device with a housing

FIG. 4 is an illustration of one embodiment of a holographic light field imaging device with a housing. FIG. 4 shows that, in one embodiment, the holographic light field imaging device 400 may comprise a compression array 350, a housing 420, and an image sensor 404. The image sensor 404 may comprise a relay lens 407 and an area scan digital light sensor 409. The compression array 350 preferably has a plurality of lenslets 355 that take in the incident light field. The housing 420 preferably blocks out stray light from reaching the relay lens 407.

As shown in FIG. 4, the image sensor 404 may be an off the shelf 2D digital camera, and the relay system 407 may be an off the shelf lens. The back of the diffuser 505 (shown in FIG. 5) may be an optical surface that is imaged onto the image sensor 404. The image sensor 404 may be integrated with a relay lens 407. The optical surface 505 is imaged by the relay system 404 onto a recording medium. Preferably, the optical surface 505 randomly or nearly-randomly, scatters the light passing through the compression array 350 in a known way. The diffuser surface 505 may be the surface of a holographic diffuser. The relay system 407 and the image sensor 404 may exhibit a materially different etendue from the compression array 350. The compression array is sometimes referred to as the projective optical system. The photographic medium of the sensor 409 may be a charge-coupled device (CCD) sensor or complementary metal-oxide semiconductor (CMOS) sensor. There may be a plurality of relay systems 404 and/or recording devices 409.

In some embodiments the surface 505 may be a photographic recording medium other than a digital light sensor. It could be a scanning photosensor, a digital line-scan sensor, or even film emulsion. The intent of the sensor is to convert the incoming photons into a digital representation for later reconstruction, such that each region in the imager or pixel in the image represents a sample of the encoded light field signal. While an area scan digital sensor is the preferred form for taking these measurements, other forms of sampling may be used without loss of generality. In some embodiments the relay system 404 may conducts the light to a recording medium via total internal reflection inside a dielectric. The light could be conveyed to the digital sensor via fiber optic tapers, either singly or in an array, and could relay the light to one or more digital sensors. In some embodiments the image sensor 404 may utilize a relay lens with fixed, known optical conjugates, improving the aberration performance of the optical system while maximizing its light-gathering capabilities. In other embodiments the image sensor 404 may comprise significant magnification or minimization, such that the area imaged on the back of the diffuser 1300 is larger or smaller than the area of the digital sensor(s) 404.

Figure 5:
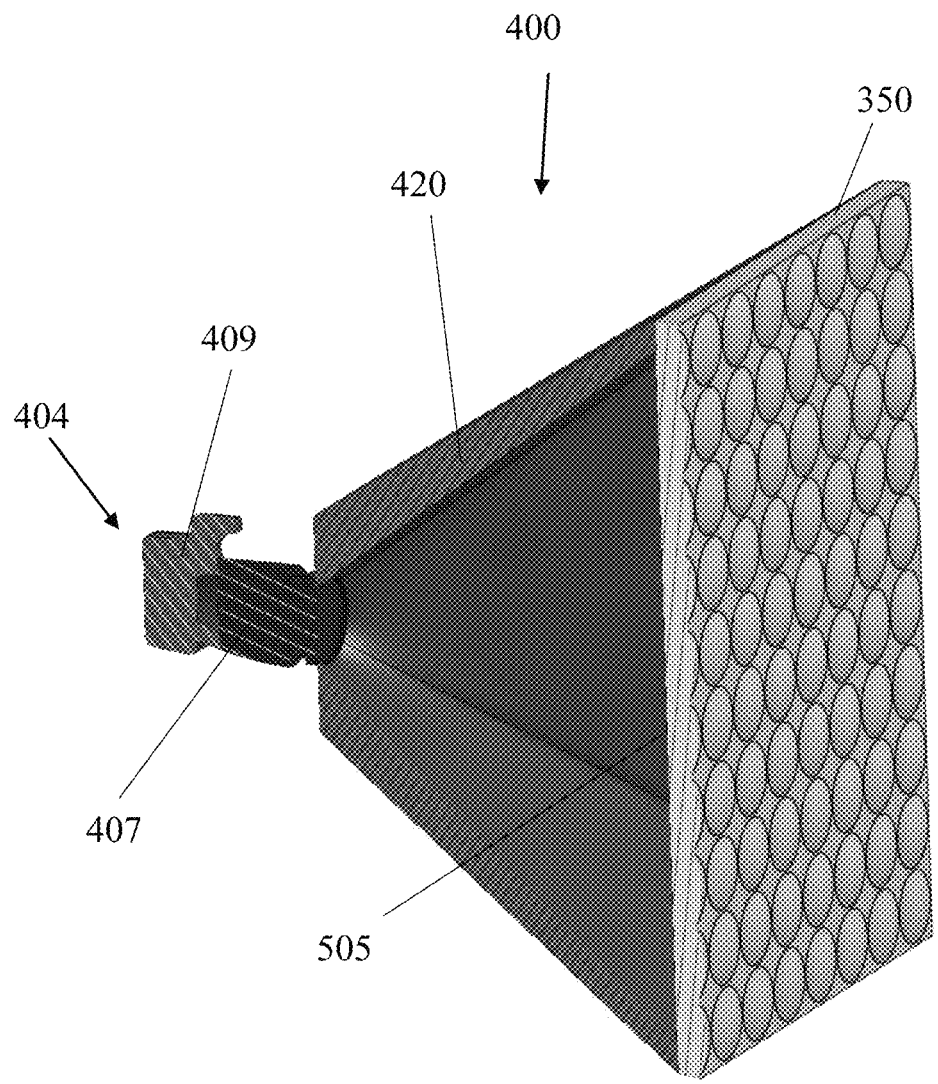
FIG. 5 is an illustration of a cross-section view of one embodiment of a holographic light field imaging device.

FIG. 5 is an illustration of a cross-section view of one embodiment of a holographic light field imaging device. FIG. 5 shows how the housing 420 preferably extends from the front of the relay lens 407 to the back of the diffuser 505. The relay lens 407 may preferably be part of a relay system that maps the intensity of the light on a specific region of the back of the diffuser 505 to become a pixel on the sensor 409.

Figure 6:
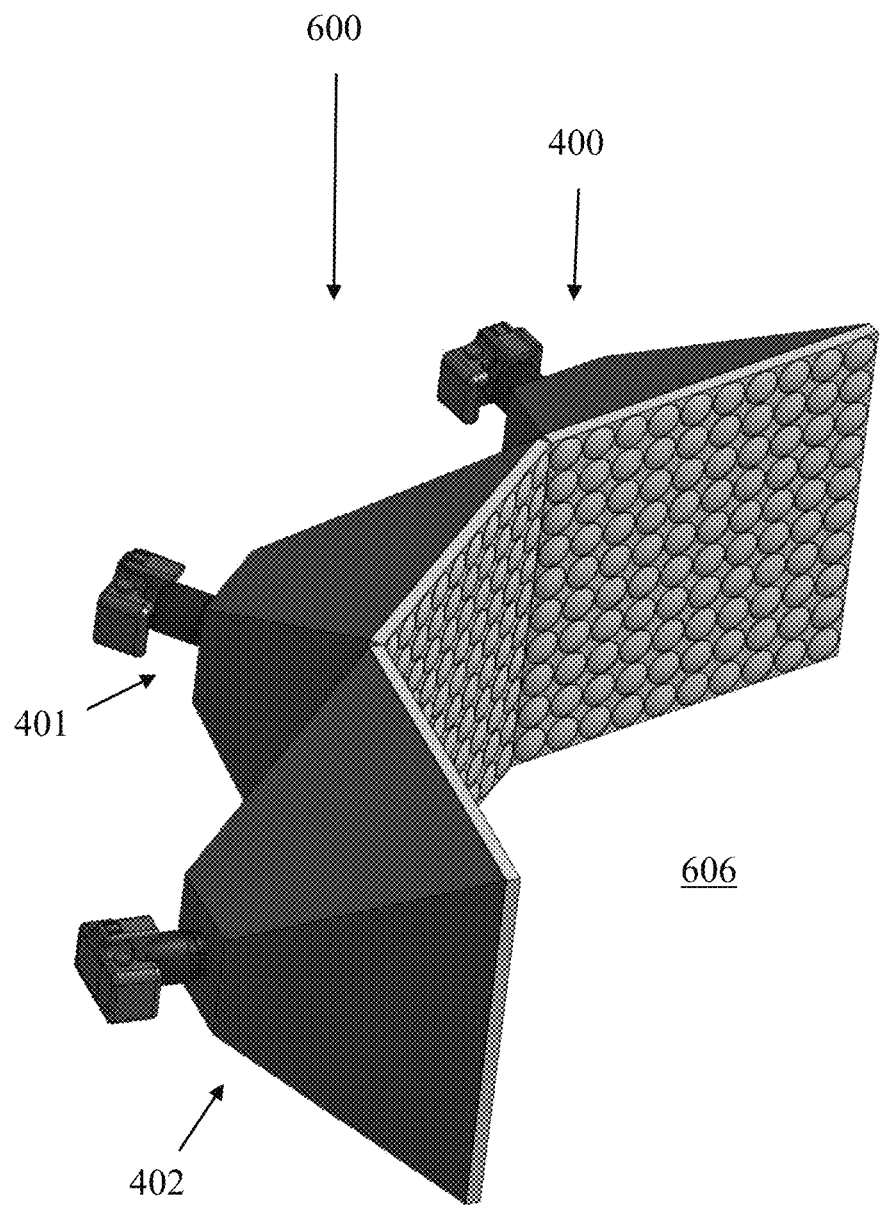
FIG. 6 is an illustration of an inward facing arrangement of several of the holographic light field imaging devices.

FIG. 6 is an illustration of an inward facing arrangement of several of the holographic light field imaging devices. As shown in FIG. 6, the holographic light field imaging device 400 may be combined with other, identical or similar, holographic light field imaging devices 401, 402, to form an inward facing array 600. The array 600 may capture the light field emanating from a surrounded scene 606. This might be useful for generating perspectives looking inward at the scene, which, as an example, might be displayed in an augmented reality headset.

Figure 7:
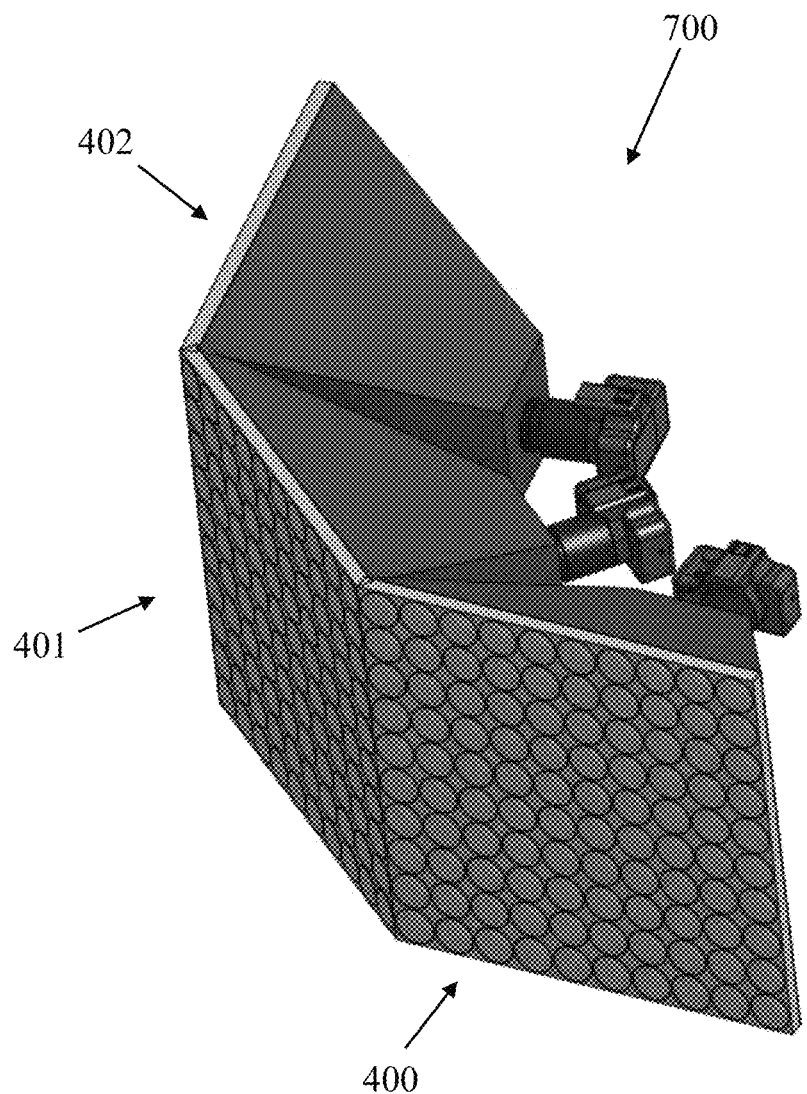
FIG. 7 is an illustration of an outward facing arrangement of several of the holographic light field imaging devices.
Figure 8:
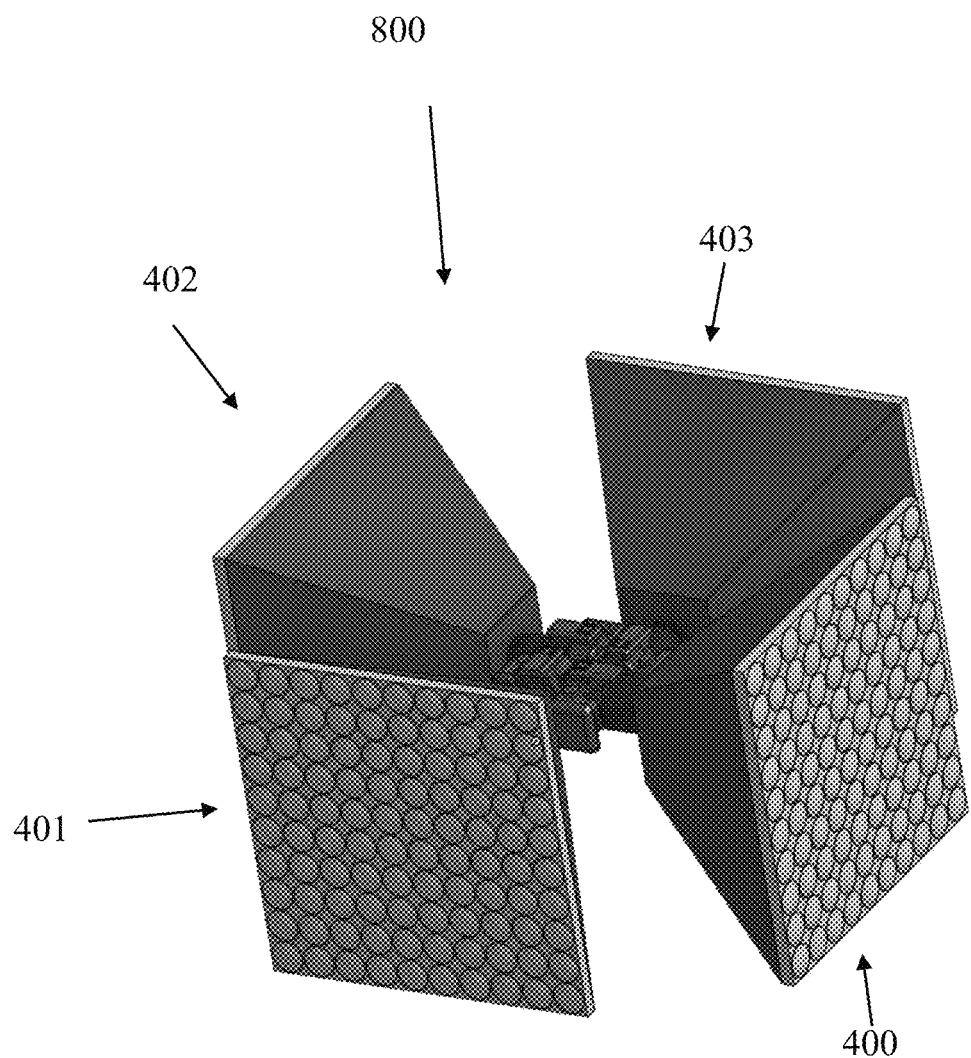
FIG. 8 is an illustration of an outward facing omnidirectional arrangement of several of the holographic light field imaging devices.

FIG. 7 is an illustration of an outward facing arrangement of several of the holographic light field imaging devices. FIG. 8 is an illustration of an outward facing omni-directional arrangement of several of the holographic light field imaging devices. As shown in FIGS. 7 and 8, show two embodiments of an outward facing array 700, 800. In array 700, the light field captured may be a contiguous extended light field. Arrays 700, 800 may describe an incident light surface that partially or complete encloses the position of the viewer. Any of the various views may be reconstructed and the light field projection may be immersive and deliver a view regardless of the viewing direction.

In one embodiment, the front optics compression array does not have to have a 1:1 correspondence with the imaging sensor. Instead, multiple relay lenses may intake light from a single compression array, or a single image sensor may intake images from multiple compression arrays. The single sensor, multiple compression array arrangement may provide for easier manufacturing, because this reduces the size of the compression arrays that must be fabricated and still get a large image field. A multiple sensor, single compression array arrangement may improve the capture resolution, improve the noise floor of the signal, and improve the overlap and alignment between the panels.

Figure 9A:
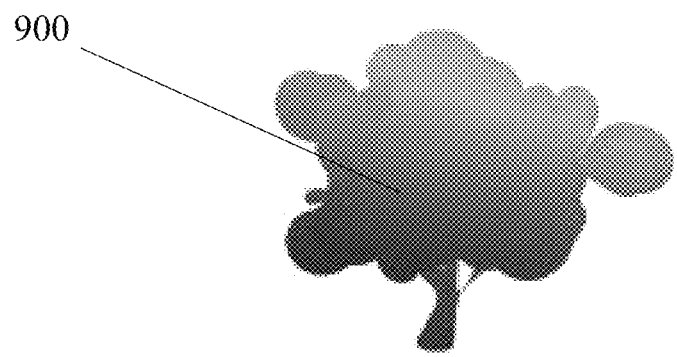
FIG. 9a is an illustration of a scene.
Figure 9B:
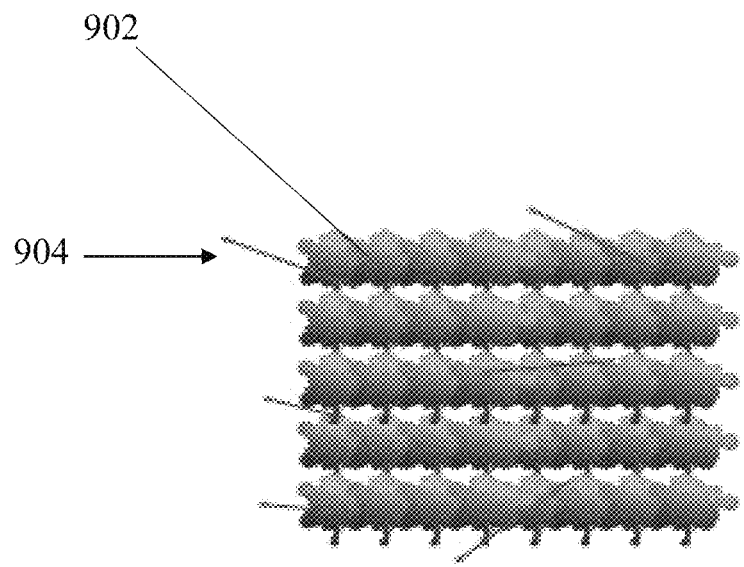
FIG. 9b is an illustration that shows that the collection of all the light from the scene is a light field.

FIG. 9a is an illustration of a scene, and FIG. 9b is an illustration that shows that the collection of all the light from the scene is a light field. FIGS. 9a and 9b shows that the collection of all the light from the scene 900 is a light field 902. The light field 902 includes all possible perspectives of the scene 900, and can be modeled as a 4-dimensional surface: two spatial dimensions, and two angular dimensions defining the direction of the field at each spatial point 904.

Figure 10A:
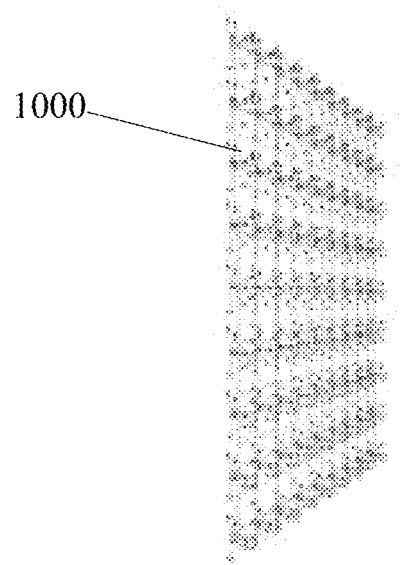
FIG. 10a is an illustration of light rays from the scene being incident on the surface of one embodiment of a holographic light field imaging device.
Figure 10B:
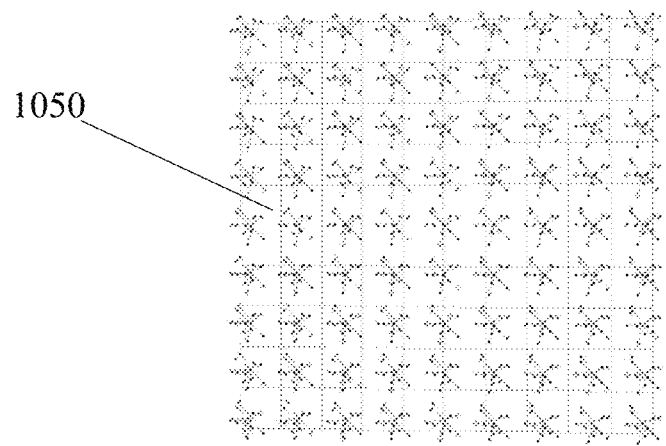
FIG. 10b is a representation of the input light field thereof.

FIG. 10a is an illustration of light rays from the scene being incident on the surface of one embodiment of a holographic light field imaging device, and FIG. 10b is a representation of the input light field thereof. As shown in FIG. 10a, the surface 1000, which may be similar to surface 350, captures some of the light rays from the scene are incident on the capture device. This creates an input light field 1050.

Figure 11A:
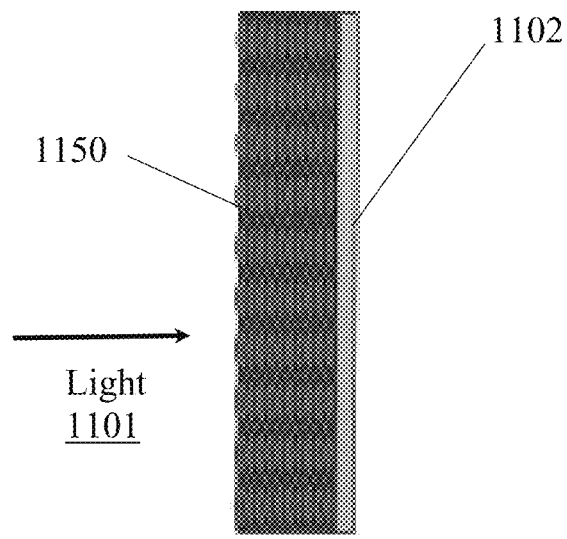
FIG. 11a is an illustration of a surface of a compression array of one embodiment of a holographic light field imaging device.
Figure 11B:
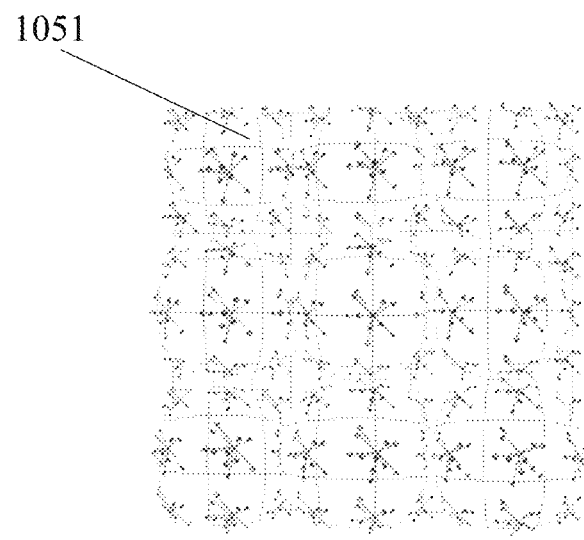
FIG. 11b shows how the light field may be shuffled as it passes through the refractive or diffractive surface.

FIG. 11a is an illustration of a surface of a compression array of one embodiment of a holographic light field imaging device, and FIG. 11b shows how the light field may be shuffled as it passes through the refractive or diffractive surface. If the surface 1150 is refractive or diffractive, the light 1101 will be shuffled as it passes through the surface 1150 and out the back 1102. In this manner, the light field 1050 is shuffled into light field 1051. Some of the spatial and angular values of the light field are swapped, which pushes more of the scene entropy into the spatial domain.

Figure 12A:
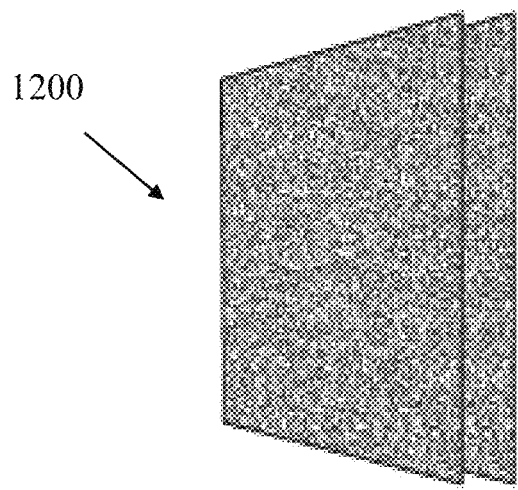
FIG. 12a is an illustration of one embodiment of two masks of one embodiment of a holographic light field imaging device that the light rays pass through, and FIG. 12b shows how the light field passing through the compression array is encoded with a pattern of dark spots where the light has been blocked.
Figure 12B:
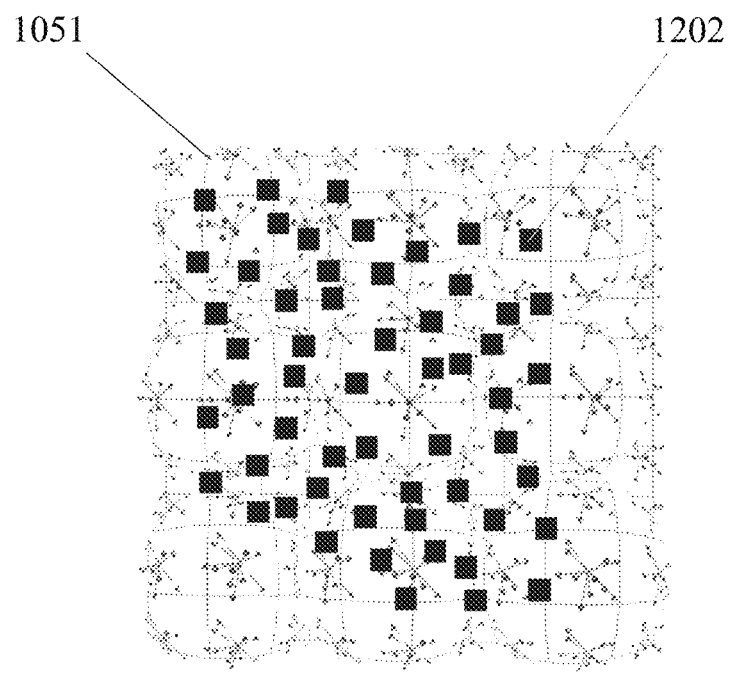

FIG. 12a is an illustration of one embodiment of two masks of one embodiment of a holographic light field imaging device that the light rays pass through and FIG. 12b shows how the light field passing through the compression array is encoded with a pattern of dark spots where the light has been blocked. FIG. 12a shows the two occluding masks 1200 and that the light field passes through. The light field 1051 is encoded with a pattern of dark spots 1202, where the light has been blocked. The encoding preferably may be implemented with local refraction, diffraction, attenuation, occlusion (as shown in FIG. 12b).

Figure 13A:
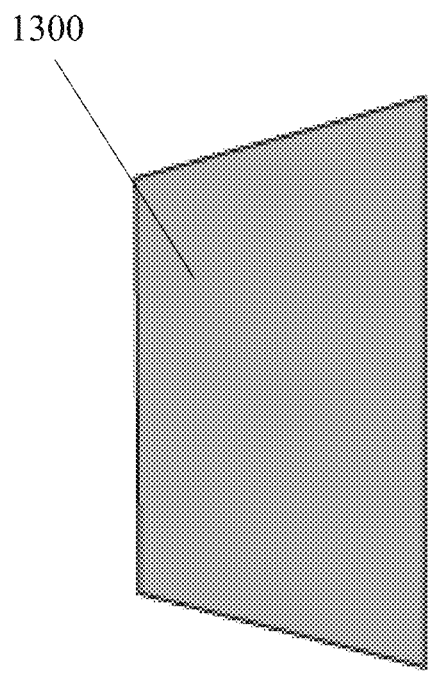
FIG. 13a is an illustration of one embodiment of a diffuser of the compression array of one embodiment of a holographic light field imaging device, thus creating the entropic image shown in FIG. 13b.
Figure 13B:
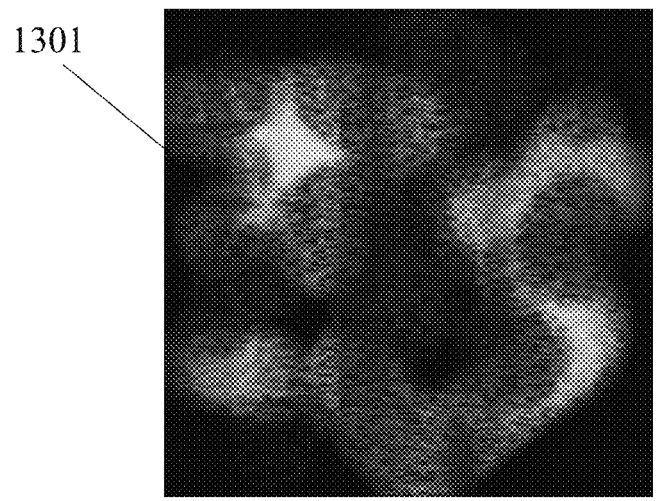

FIG. 13a is an illustration of one embodiment of a diffuser of the compression array of one embodiment of a holographic light field imaging device, thus creating the entropic image shown in FIG. 13b. At the back of the compression array there preferably may be a diffuser 1300. The light passing past the masks strike the diffuser 1300 creating the entropic image 1301. This finalizes the transformation of the four-dimensional light field into a two-dimensional representation, which is the same regardless of which direction it is viewed from. This allows the relay system to capture a representative sample of the 4D light field on a 2D sensor.

Figure 14:
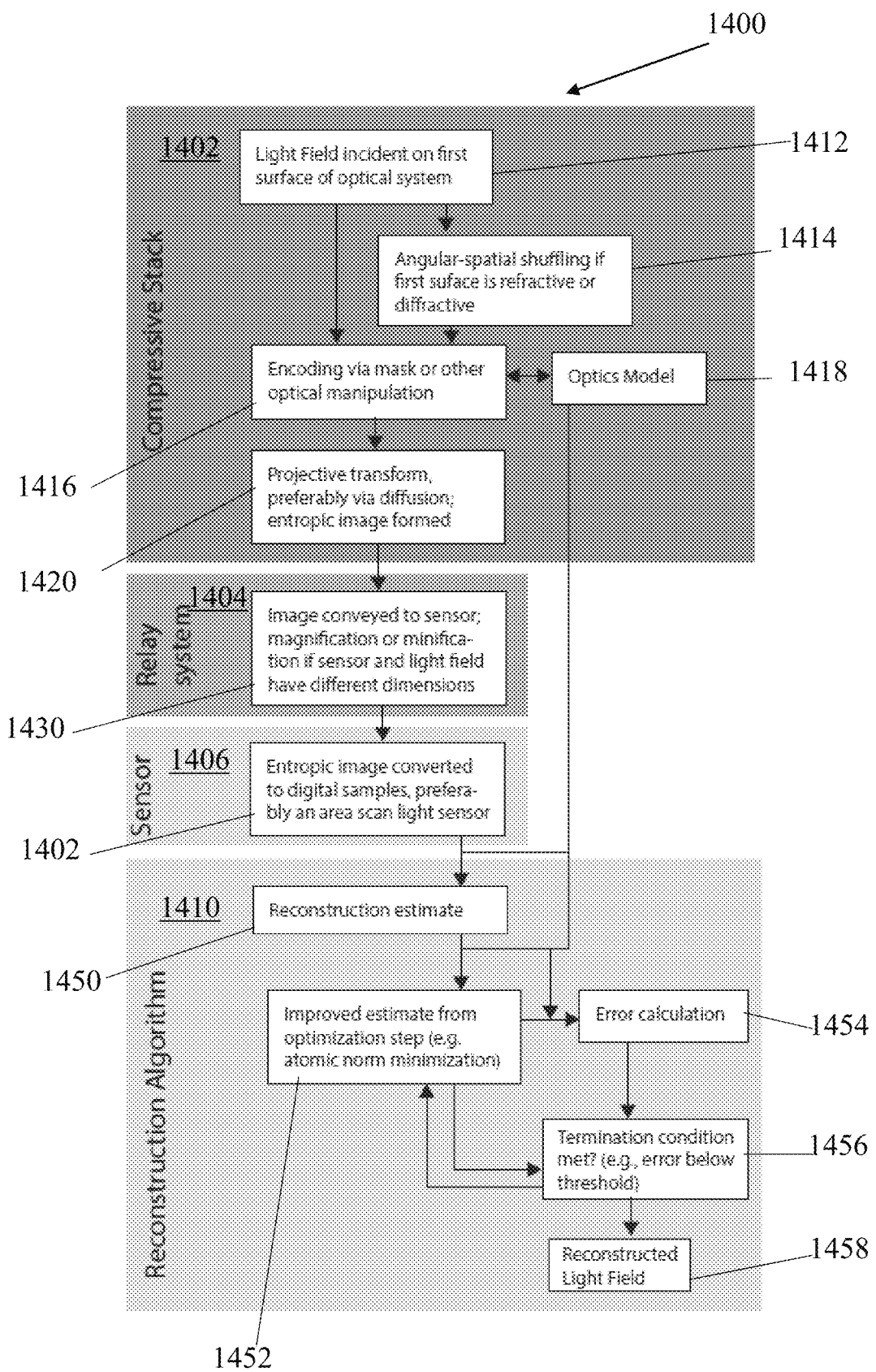
FIG. 14 is a flow block diagram of one embodiment of the signal flow of the holographic light field imaging system.

FIG. 14 is a flow block diagram of one embodiment of the signal flow of the holographic light field imaging system. As shown in FIG. 14, the signal flow 1400 may flow through a compressive stack 1402, a relay system 1404, a sensor 1406, and a reconstruction algorithm 1410. In the compressive stack 1402, the signal may begin with the light field incident on a first surface of the optical system 1412. In some embodiments there may be angular-spatial shuffling if the first surface is refractive or diffractive 1414. As shown, there may be encoding via a mask or other optical manipulation 1416. This encoding can be represented as an optics model 1418, which may be used in the reconstruction of the incident light field. There may be a projective transformation, preferably via diffusion and an entropic image may be formed 1420. The signal may go to the relay system 1404, where the image is conveyed to a sensor; there may be magnification or minification if the sensor and light field have different dimensions 1430. The signal may then go to a sensor 1406, where the entropic image may be converted to digital sample. This may preferably be an area scan light sensor 1440. FIG. 14 shows that the reconstruction algorithm 1410 may be used to reconstruct the original incident light field through a reconstruction estimate 1450, improved estimate from an optimization step (e.g. atomic norm minimization) 1452, possibly including an error calculation 1454, determining if termination conditions are met (e.g., error being below a certain threshold) 1456, and then ending with a reconstructed light field 1458 that is substantially similar to or identical to the original incident light field.

In some embodiments, the incident or input light field may be represented monochromatically or in a color gamut represented by a discrete number of color channels. The incident light field may comprise a continuous spectrum and the reconstruction may recover this continuous spectrum. In some embodiments the optical spectrum of the light field may be represented by a sparse dictionary.

The incident light field may have two angular dimensions and one spatial dimension. In other embodiments, the incident light field may have fewer than two angular dimensions and/or fewer than two spatial dimensions. The first or intake surface may be substantially flat or may be curved.

The reconstruction algorithm may use an emissions matrix, which may be defined by, and/or embodied in, the encoding masks and other optics. In other embodiments, the encoding masks may be dictated by the emissions matrix. In other embodiments the algorithm may be calibrated to reflect the actual optics and encoding masks used as part of the holographic imaging device. In some embodiments, this calibration may be achieved by passing a predefined light field through the device and observing the result. In other embodiments this is achieved by direct observation of the optics and masks. In some embodiments, calibration patterns (such as fiducial marks) may be displayed on the one or more encoding masks to aid in calibration of the system and fine tuning of the reconstruction algorithm. The reconstruction algorithm may use an optimization to reconstruct a sparse representation of the sensed light field: this optimization may use atomic norm minimization, gradient descent, and/or stochastic gradient descent to perform the reconstruction. In some embodiments the reconstruction algorithm may operate on a hashed transform of the sparse signal space. The hashing function may be random or pseudo-random.

In some embodiments the intermediate image may be resolved on an optical surface, wherein the optical surface is imaged by a relay system onto a recording medium.

The composition of the optical stack (compression array) dictates the relationship between the incident light field and the 2D image recorded on the light sensor. Preferably, the elements of the compression array selected are linear in light intensity. The precise specification of the compression array may be determined in many ways, including building the compression array according to specific parameters or after measurements are taken. Naturalistic light fields are known to have specific, known sparse descriptions. This can be used to assist in the reconstruction and projection of the 4D light field.

Because the source light field is sparse, finding a sparse hypothetical light field that would have generated the same, or nearly the same, recorded image as the one that is actually recorded, will generally lead to a close reconstruction of the original light field. One method of determining the hypothetical light field is to articulate the sparsity constraint as a regularized optimization problem. Another alternative is to impose sparsity as a hard constraint and construct an approximation of the recorded image iteratively (and sparsely) from the basis components.

The following references related to the algorithmic reconstruction that might be used are hereby incorporated by reference as though set forth herein in their entirety:

S. G. Mallat and Z. Zhang; *Matching Pursuits with Time-Frequency Dictionaries*, IEEE Transactions on Signal Processing, December 1993, pp. 33973415.

Candes, Emmanuel J., Romberg, Justin K., Tao; Terence *Stable signal recovery from incomplete and inaccurate measurements*, Communications on Pure and Applied Mathematics. (2006), 59 (8): 12071223; doi:10.1002/cpa.20124.

Gill, Patrick R.; Wang, Albert; Molnar, Alyosha; *The In-Crowd Algorithm for Fast Basis Pursuit Denoising*, IEEE Trans Sig Proc 59 (10), Oct. 1 2011, pp. 4595-4605.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A holographic light field imaging device, comprising:
   at least one compression array;
   at least one image sensor;
   wherein said at least one compression array comprises a first surface, a shuffling element, one or more encoding masks, and a projection element;
   wherein light striking said first surface creates an incident light field, wherein said shuffling element is configured to shuffle the incident light field between angular and spatial dimensions of the incident light field, and wherein the one or more encoding masks are configured to scramble the incident light field;
   wherein said incident light field is passed through said projection element, such that said incident light field is optically reduced from a four-dimension representation to a two-dimension representation, such that a dimensionally-reduced light field is created;
   wherein said two-dimension representation of said dimensionally-reduced light field is recorded by said image sensor, such that one or more reduced two-dimensional entropic images are created, each of the one or more reduced two-dimensional entropic images encoding a representation of the incident light field; and
   wherein said one or more reduced two-dimensional entropic images are processed by a computing device, which comprises a reconstruction algorithm that inverts said one or more reduced two-dimensional entropic images to reconstruct said incident light field.

2. The holographic light field imaging device of claim 1, wherein said first surface is a refractive surface that exhibits locally-positive curvature to increase a spatial entropy of said dimensionally-reduced light field.

3. The holographic light field imaging device of claim 2, wherein said first surface projects said incident light field to increase said spatial entropy of said dimensionally-reduced light field.

4. The holographic light field imaging device of claim 2, wherein said first surface comprises one or more diffractive-scale features to transform said incident light field to increase said spatial entropy of said dimensionally-reduced light field.

5. The holographic light field imaging device of claim 1, wherein said first surface is substantially flat and constructed of a transparent dielectric material.

6. The holographic light field imaging device of claim 5, wherein said transparent dielectric material is selected from the group of materials consisting of glass and plastic.

7. The holographic light field imaging device of claim 1, wherein said reconstruction algorithm reconstructs said incident light field in a sparse basis.

8. The holographic light field imaging device of claim 7, wherein said sparse basis is constructed from one or more of the following bases, consisting of: a Fourier domain; a wavelet domain; and a sparse dictionary.

9. The holographic light field imaging device of claim 1, wherein said one or more encoding masks comprise a substantially random pattern of occlusions, wherein said substantially random pattern of occlusions is described by an emissions matrix that informs said reconstruction algorithm.

10. The holographic light field imaging device of claim 4, wherein said diffractive-scale features to transform said incident light field is selected from the group of features consisting of at least one of: attenuation, refraction, and occlusion.

11. The holographic light field imaging device of claim 1, wherein said first surface has a diameter that is greater than 0.75 meters and does not have an objective lens.

12. The holographic light field imaging device of claim 1, wherein said projection element comprises a diffuser.

13. The holographic light field imaging device of claim 12, wherein said image sensor comprises a relay lens and a digital light sensor.

14. The holographic light field imaging device of claim 13, wherein said diffuser scatters said dimensionally-reduced light field in a substantially random manner, such that a diffused and dimensionally-reduced light field is created.

15. The holographic light field imaging device of claim 14, wherein said relay lens relays said diffused and dimensionally-reduced light field to said digital light sensor.

16. A holographic light field imaging device, comprising:
   at least one compression array;
   at least one image sensor;
   at least one housing;
   wherein said at least one compression array comprises one or more encoding masks, one or more dielectric spacers, a diffuser, and a refractive surface;
   wherein light striking said refractive surface creates an incident light field;
   wherein said incident light field is passed through said one or more encoding masks, said one or more dielectric spacers, and said diffuser, such that said incident light field is optically reduced from a four-dimension representation to a two-dimension representation, such that a dimensionally-reduced light field is created;
   wherein said refractive surface comprises a locally-positive curvature to increase a spatial entropy of said dimensionally-reduced light field;
   wherein said diffuser scatters said dimensionally-reduced light field in a substantially random manner, such that a diffused and dimensionally-reduced light field is created;
   wherein said image sensor comprises a relay lens and a digital light sensor;
   wherein said relay lens relays said diffused and dimensionally-reduced light field to said digital light sensor;
   wherein said housing substantially prevents stray light from being relayed to said digital light sensor;
   wherein said two-dimension representation of said diffused and dimensionally-reduced light field is recorded by said digital light sensor, such that one or more reduced two-dimensional entropic images are created, each of the one or more reduced two-dimensional entropic images encoding a representation of the incident light field; and
   wherein said one or more reduced two-dimensional entropic images are processed by a computing device, which comprises a reconstruction algorithm that inverts said one or more reduced two-dimensional entropic images to reconstruct said incident light field.

17. The holographic light field imaging device of claim 16, said at least one compression array is two or more compression arrays and said at least one image sensor is one image sensor.

18. The holographic light field imaging device of claim 16, wherein said at least one compression array is one compression array and said at least one image sensor is two or more image sensors.

19. The holographic light field imaging device of claim 16, wherein said holographic light field imaging device is combined with one or more holographic light field imaging devices of a similar design.

20. A holographic light field imaging device, comprising:

at least one compression array comprising a shuffling element and a projection element;

at least one image sensor;

wherein light striking said at least one compression array creates an incident light field, wherein the shuffling element is configured to shuffle the incident light field between angular and spatial dimensions of the incident light field, and wherein the compression array is further configured to scramble the incident light field;

wherein said incident light field is passed through said projection element of said at least one compression array, such that said incident light field is optically reduced from a four-dimension representation to a two-dimension representation, such that a dimensionally-reduced light field is created; and wherein said two-dimension representation of said dimensionally-reduced light field is recorded by said image sensor, such that one or more reduced two-dimensional entropic images are created, each of the one or more reduced two-dimensional entropic images encoding the incident light field.

21. The holographic light field imaging device of claim 20, wherein said one or more reduced two-dimensional entropic images are processed by a computing device, which comprises a reconstruction algorithm that inverts said one or more reduced two-dimensional entropic images to reconstruct said incident light field.

22. The holographic light field imaging device of claim 20, wherein said at least one compression array comprises a first surface;

wherein said first surface is a refractive surface that exhibits locally-positive curvature to increase a spatial entropy of said dimensionally-reduced light field.

23. The holographic light field imaging device of claim 22, wherein said first surface projects said incident light field to increase said spatial entropy of said dimensionally-reduced light field.

24. The holographic light field imaging device of claim 22, wherein said first surface comprises one or more diffractive-scale features to transform said incident light field to increase said spatial entropy of said dimensionally-reduced light field.

25. The holographic light field imaging device of claim 20, wherein a first surface of said at least one compression array is substantially flat and constructed of a transparent dielectric material.

26. The holographic light field imaging device of claim 21, wherein said reconstruction algorithm reconstructs said incident light field in a sparse basis.

27. The holographic light field imaging device of claim 26, wherein said sparse basis is constructed from one or more of the following bases, consisting of: a Fourier domain; a wavelet domain; and a sparse dictionary.

28. The holographic light field imaging device of claim 20, wherein said at least one compression array comprises a substantially random pattern of occlusions.

29. The holographic light field imaging device of claim 28, wherein said substantially random pattern of occlusions is described by an emissions matrix that informs a reconstruction algorithm.

30. The holographic light field imaging device of claim 20, wherein said projection element comprises a diffuser.

31. The holographic light field imaging device of claim 20, wherein said shuffling element comprises one or more lenses.

32. The holographic light field imaging device of claim 20, wherein said compression array is configured to scramble the incident light field via one or more encoding masks.

* * * * *